(12) United States Patent
Kim et al.

(10) Patent No.: US 10,175,792 B2
(45) Date of Patent: Jan. 8, 2019

(54) ROLLABLE DISPLAY DEVICE

(71) Applicant: SAMSUNG DISPLAY CO., LTD., Yongin-si, Gyeonggi-do (KR)

(72) Inventors: Min-sung Kim, Hwaseong-si (KR); Thanh Tien Nguyen, Seoul (KR); Kiju Im, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 215 days.

(21) Appl. No.: 14/958,787

(22) Filed: Dec. 3, 2015

(65) Prior Publication Data

US 2016/0231843 A1 Aug. 11, 2016

(30) Foreign Application Priority Data

Feb. 10, 2015 (KR) ........................ 10-2015-0020434

(51) Int. Cl.
*G06F 1/16* (2006.01)
*H05K 5/00* (2006.01)
*H05K 7/00* (2006.01)
*G06F 3/041* (2006.01)
(Continued)

(52) U.S. Cl.
CPC .......... *G06F 3/0412* (2013.01); *G06F 1/1652* (2013.01); *G06F 3/041* (2013.01); *G09F 9/301* (2013.01); *G09F 11/30* (2013.01); *G06F 2203/04102* (2013.01)

(58) Field of Classification Search
CPC ......... G06F 1/1652; G06F 2203/04102; G06F 3/041; G06F 3/0412; G09F 11/30; G09F 9/301
See application file for complete search history.

(56) References Cited

U.S. PATENT DOCUMENTS 6,016,176 A * 1/2000 Kim .................. G02F 1/133305
349/158
8,096,068 B2 1/2012 Van Rens
(Continued)

FOREIGN PATENT DOCUMENTS

| JP | 3962418 B2 | 8/2007 |
| KR | 10-1273182 B1 | 6/2013 |
| KR | 10-1400298 B1 | 6/2014 |

OTHER PUBLICATIONS

Abstract for Japanese Publication No. 2006091900 A, Apr. 6, 2006 for Japanese Patent No. 3962418 B2, Aug. 22, 2007, 1 Page.

*Primary Examiner* — Yuriy Semenenko
(74) *Attorney, Agent, or Firm* — Lewis Roca Rothgerber Christie LLP

(57) ABSTRACT

A rollable display device includes a flexible display module configured to display an image, a roller configured to roll up the flexible display module, and a plurality of support block groups each including a plurality of support blocks on the flexible display module and arranged in a first direction crossing a second direction of a rolling axis of the roller, the plurality of support block groups including a first support block group including first support blocks, and a second support block group including second support blocks each having a width in the first direction that is greater than a width of a corresponding one of the first support blocks in the first direction, wherein the first support block group is between the roller and the second support block group.

20 Claims, 23 Drawing Sheets

(51) Int. Cl.
*G09F 9/30* (2006.01)
*G09F 11/30* (2006.01)

(56) References Cited

U.S. PATENT DOCUMENTS

| | | | |
|---|---|---|---|
| 2006/0007368 A1* | 1/2006 | Slikkerveer | G09F 9/35 349/58 |
| 2007/0211036 A1* | 9/2007 | Perkins | G06F 1/1615 345/173 |
| 2008/0086925 A1* | 4/2008 | Yang | H04M 1/0268 40/610 |
| 2010/0246113 A1* | 9/2010 | Visser | G06F 1/1601 361/679.3 |
| 2011/0227855 A1* | 9/2011 | Kim | G02F 1/13306 345/173 |
| 2014/0321073 A1* | 10/2014 | Hong | G06F 1/1652 361/749 |

* cited by examiner

ROLLABLE DISPLAY DEVICE

CROSS-REFERENCE TO RELATED APPLICATION

This patent application claims priority to and the benefit of Korean Patent Application No. 10-2015-0020434, filed on Feb. 10, 2015, the contents of which are hereby incorporated by reference in its entirety.

BACKGROUND

1. Field

The present disclosure relates to a rollable display device. More particularly, the present disclosure relates to a rollable display device having a structure to maintain an unrolled state of a flexible display panel.

2. Description of the Related Art

In recent years, a display panel that is bendable or foldable (hereinafter, referred to as a flexible display panel) has been actively developed. In addition, a foldable or rollable display device using the flexible display panel has been suggested.

The flexible display panel of the rollable display device may display an image while being in an unrolled state. When the use of the rollable display device has ended, the rollable display device may be rolled up.

SUMMARY

The present disclosure provides a rollable display device capable of maintaining an unrolled state of a flexible display panel.

Embodiments of the inventive concept provide a rollable display device including a flexible display module configured to display an image, a roller configured to roll up the flexible display module, and a plurality of support block groups each including a plurality of support blocks on the flexible display module and arranged in a first direction crossing a second direction of a rolling axis of the roller, the plurality of support block groups including a first support block group including first support blocks, and a second support block group including second support blocks each having a width in the first direction that is greater than a width of a corresponding one of the first support blocks in the first direction, wherein the first support block group is between the roller and the second support block group.

The roller may have a polygonal column shape including n side surfaces, n being a natural number equal to or greater than 3.

The first support block group may include (n−1) first support blocks, and the second support block group may include n second support blocks.

The first support block group may include n first support blocks, and the second support block group may include n second support blocks.

Each of the n first support blocks may include a magnetic support block, and each of the n second support blocks may include a metallic support block.

Each of the first and second support blocks may include a magnetic support block, wherein adjacent ones of the first support blocks may have oppositely arranged magnetic poles with respect to the second direction, and adjacent ones of the second support blocks may have oppositely arranged magnetic poles with respect to the second direction.

Each of the first and second support blocks may include a magnetic portion, and a non-magnetic portion adjacent the magnetic portion.

Each of the first and second support blocks may include a first support portion, and a second support portion spaced from the first support portion in the second direction.

Each of the first and second support blocks may include a non-magnetic support block with a magnetic substance coupled thereto.

The roller may have a polygonal column shape including 2n−1 side surfaces, n being a natural number equal to or greater than 2, the first support block group may include 2n−1 first support blocks including alternately arranged magnetic and non-magnetic support blocks, and the second support block group may include 2n−1 second support blocks including alternately arranged magnetic and non-magnetic support blocks.

One of the alternately arranged magnetic and non-magnetic support blocks may include a metallic support block.

The roller may have a polygonal column shape including 2n side surfaces, n being a natural number equal to or greater than 2, the first support block group may include 2n first support blocks including at least one magnetic support block, and the second support block group may include 2n second support blocks including at least one magnetic support block.

First to (2n−1)th support blocks of the 2n first support blocks may include magnetic support blocks, a 2n-th support block of the 2n first support blocks may include a metallic support block, first to (2n−1)th support blocks of the 2n second support blocks may include a magnetic support block, and a 2n-th support block of the 2n second support blocks may include a metallic support block.

Magnetic poles of the magnetic support blocks of the first support blocks may be oppositely arranged in the first direction to magnetic poles of the magnetic support blocks of the second support blocks.

The first support blocks may include alternately arranged magnetic and metal support blocks, the second support blocks may include alternately arranged magnetic and metal support blocks, and magnetic poles of the magnetic support blocks of the first support blocks may be oppositely arranged in the first direction to magnetic poles of the magnetic support blocks of the second support blocks.

The first support blocks may include alternately arranged magnetic and metal support blocks, the second support blocks may include alternately arranged magnetic and metal support blocks, and an order of the alternately arranged magnetic and metal support blocks of the first support blocks may be opposite to an order of the alternately arranged magnetic and metal support blocks of the second support blocks.

The rollable display device may further include a housing accommodating the roller, the housing defining a slit through which the flexible display module is configured to pass.

The flexible display module may include a display panel, a touch panel on the display panel, and a window member on the touch panel.

Embodiments of the inventive concept provide a rollable display device including a flexible display module configured to display an image, a roller configured to roll up the flexible display module, a plurality of first support blocks on the flexible display module, each of the first support blocks having a width within a first range in a first direction crossing a second direction of a rolling axis of the roller, and a plurality of second support blocks on the flexible display module, each of the second support blocks having a width in the first direction within a second range that is greater than the first range, wherein the first support blocks are between the roller and the second support blocks.

Adjacent ones of the first and second support blocks may contact each other when the flexible display module is unrolled from the roller.

According to the above, the support blocks of the second support block group rolled up on the roller define a polygonal shape that is greater than a polygonal shape defined by the support blocks of the first support block group. The polygonal shape increases from the first support block group to an m-th support block group. Therefore, the flexible display module is regularly rolled up on the roller.

The unrolled state of the flexible display module is stably maintained by the attractive force between the magnetic support blocks and/or the attractive force between the magnetic support blocks and the metal support blocks.

When the arrangement of the magnetic support blocks is controlled, a distortion caused by the repulsive force that is generated between overlapping magnetic support blocks may be prevented.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Figure 1:
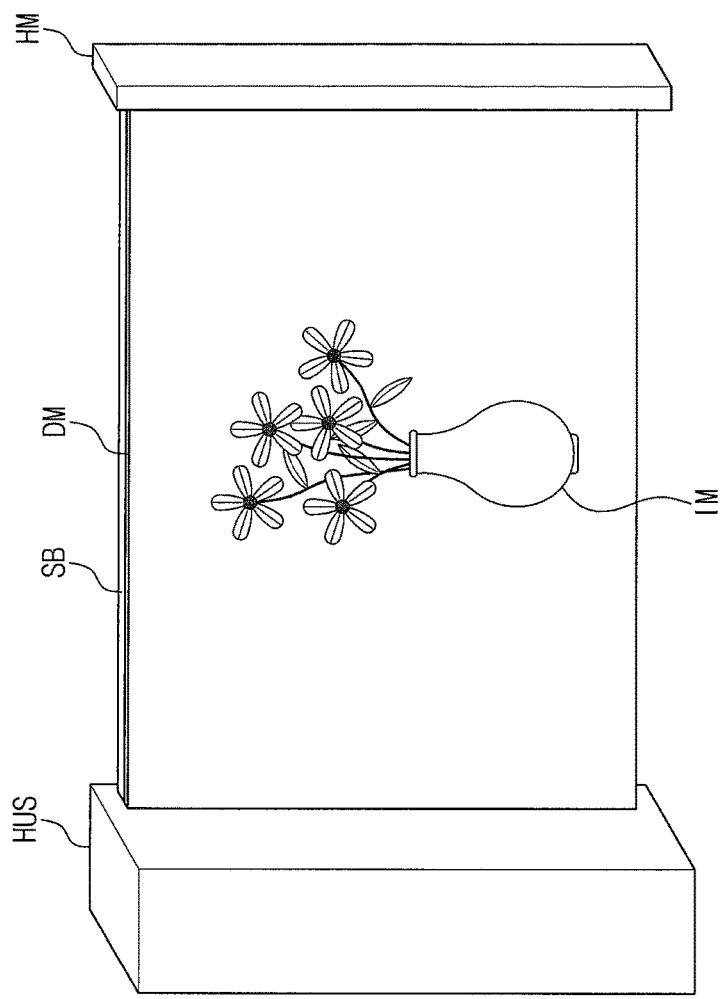
FIG. 1 is a perspective view showing a rollable display device according to an exemplary embodiment of the present disclosure.
Figure 1:
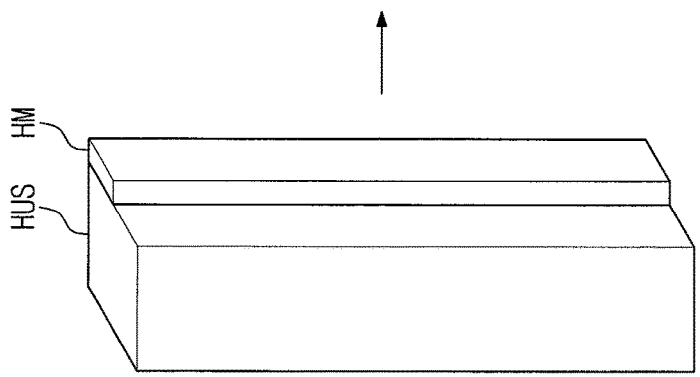
Figure 1:
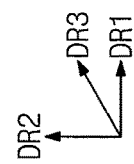

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, the present invention will be explained in detail with reference to the accompanying drawings.

Figure 2A:
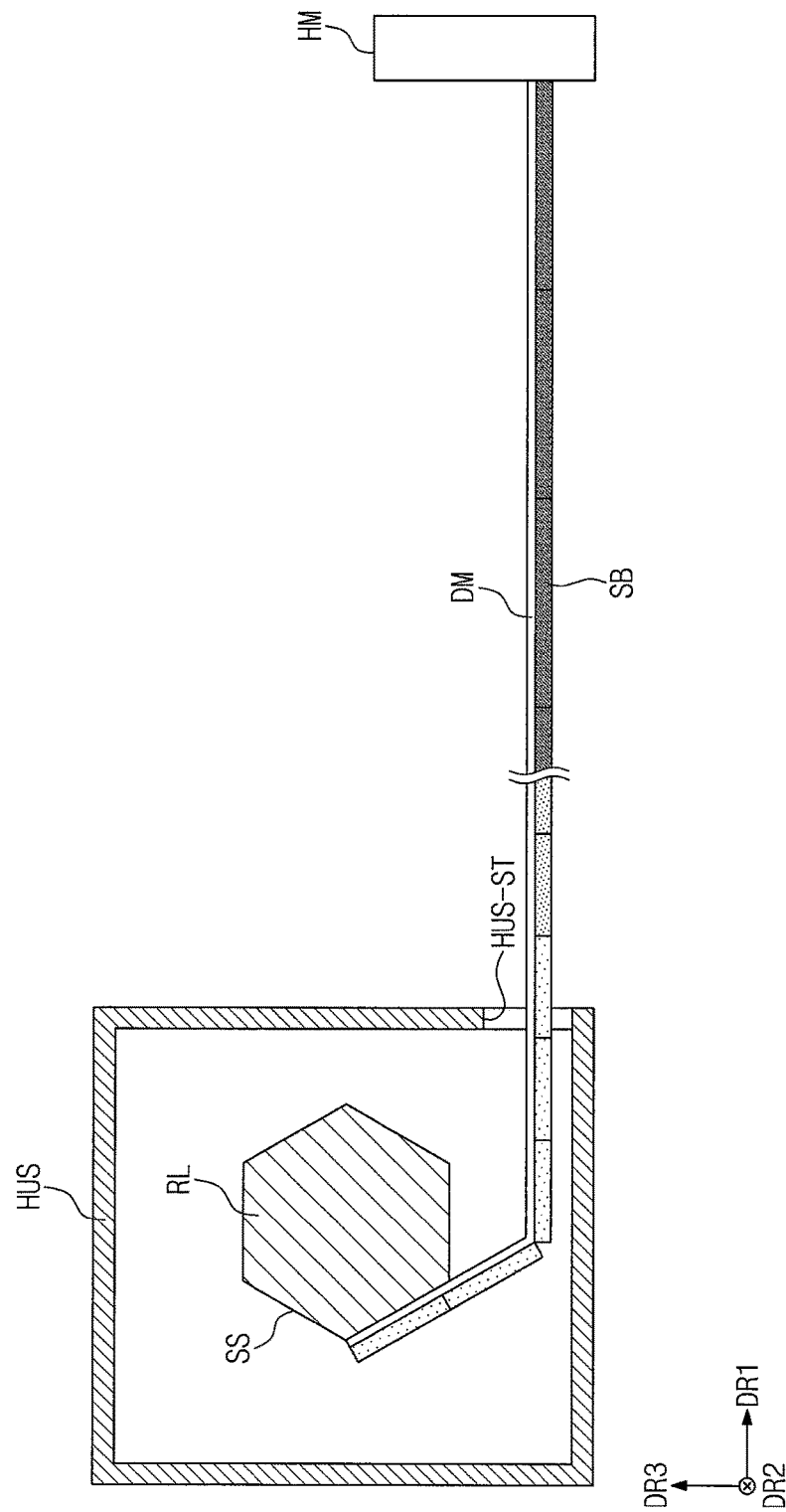
FIG. 2A is a side view showing a rollable display device in an unrolled state according to an exemplary embodiment of the present disclosure.
Figure 2B:
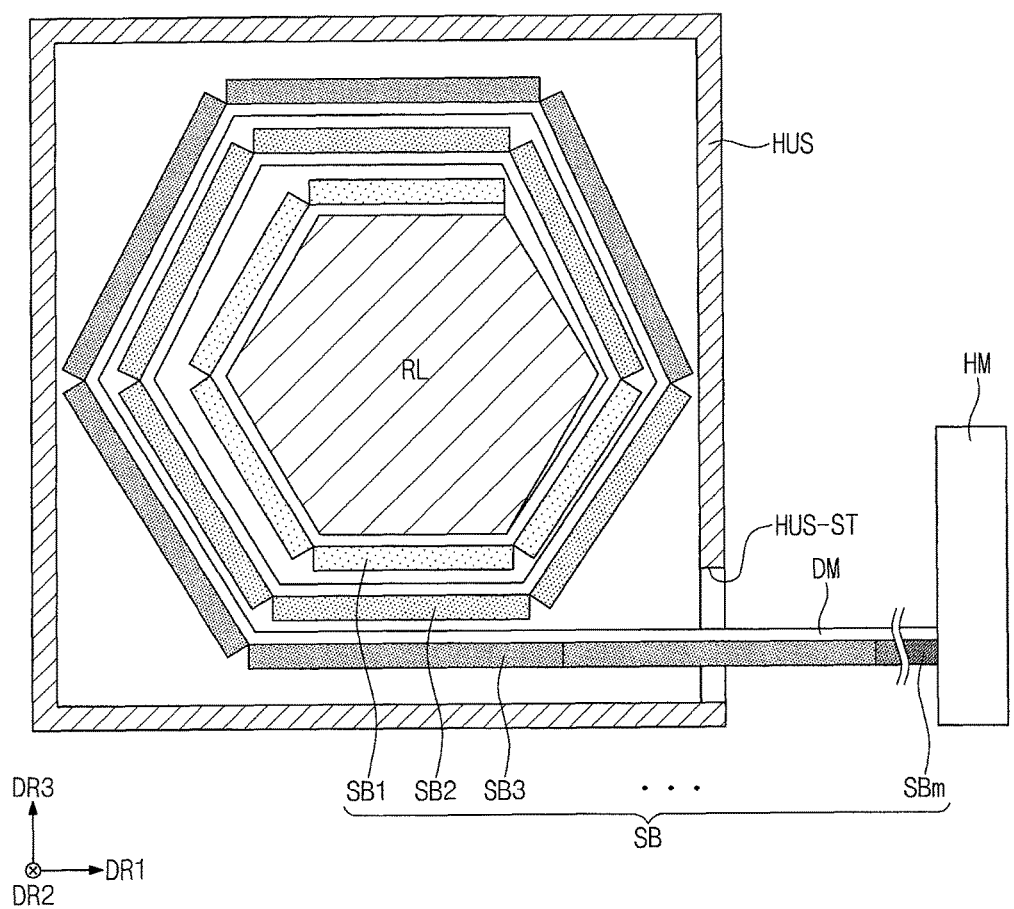
FIG. 2B is a side view showing a rollable display device in a rolled-up state according to an exemplary embodiment of the present disclosure.
Figure 2C:
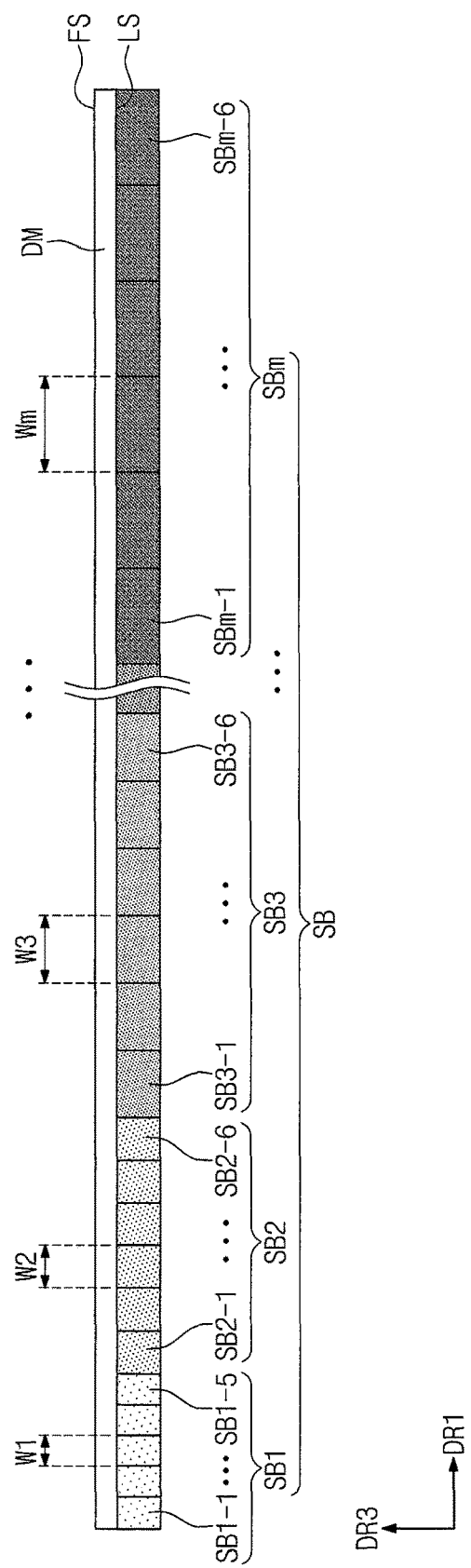
FIG. 2C is an enlarged side view showing support blocks according to an exemplary embodiment of the present disclosure.
Figure 2D:
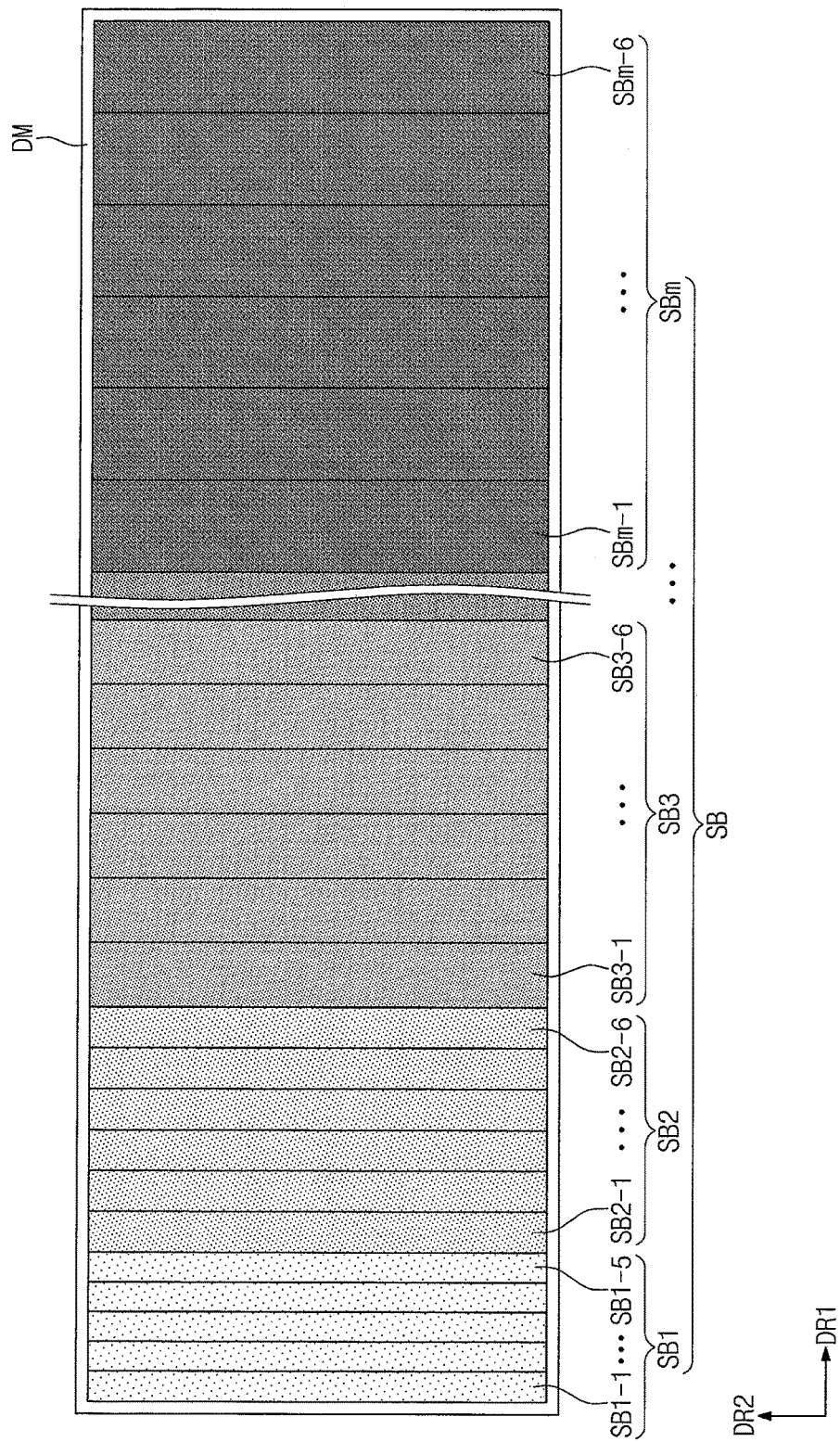
FIG. 2D is an enlarged side view showing support blocks according to an exemplary embodiment of the present disclosure.

FIG. 1 is a perspective view showing a rollable display device according to an exemplary embodiment of the present disclosure, FIG. 2A is a side view showing a rollable display device in an unrolled state according to an exemplary embodiment of the present disclosure, FIG. 2B is a side view showing a rollable display device in a rolled-up state according to an exemplary embodiment of the present disclosure, FIG. 2C is an enlarged side view showing support blocks according to an exemplary embodiment of the present disclosure, and FIG. 2D is an enlarged side view showing support blocks according to an exemplary embodiment of the present disclosure.

Referring to FIGS. 1 and 2A to 2D, the rollable display device includes a flexible display module DM, a plurality of support blocks SB, a roller RL, and a housing HUS. First and second directions DR1 and DR2 that are substantially perpendicular to each other form a plane that is parallel to a display surface of the flexible display module DM, and a third direction DR3 indicates a thickness direction of the flexible display module DM. A front surface FS and a rear surface LS (see FIG. 2C) of the flexible display module DM are defined and arranged along the third direction DR3. The front surface FS of the flexible display module DM, on which an image IM is displayed, is defined as the display surface.

The flexible display module DM and the support blocks SB are rolled up on, or unrolled from, the roller RL. The flexible display module DM may display the image IM while being in an unrolled state, and may gradually display the image IM while being unrolled. Hereinafter, the unrolled state of the flexible display module DM is referred to as a first mode, and the rolled-up state of the flexible display module DM is referred to as a second mode.

The rollable display device includes a holding member HM coupled to the flexible display module DM and to be held by a user to allow the flexible display module DM to be unrolled. In the present exemplary embodiment, the rollable display device may further include a driving part (e.g., a motor) to rotate the roller RL. When the roller RL is rotated by the driving part, the holding member HM may be omitted.

Referring to FIGS. 2A and 2B, the roller RL is accommodated in the housing HUS. The roller RL is fixed within the housing HUS to be rotatable. The flexible display module DM and the support blocks SB may move in or out of the housing HUS through a slit HUS-ST formed through the housing HUS. At least one of the flexible display module DM and the support blocks SB are coupled to the roller RL. One end portion of the flexible display module DM or of one of the support blocks located at an outermost position among the support blocks SB may be coupled to the roller RL. Accordingly, the rollable display device may further include a structure to couple at least one of the flexible display module DM and the support blocks SB to the roller RL. In addition, a communication module or a control module may be located in the housing HUS after being mounted on a circuit board.

Referring to FIG. 2A, the support blocks SB make contact with adjacent ones of each other in the first/unrolled mode to support the flexible display module DM. The support blocks SB making contact with respective ones of each other maintain the unrolled state of the flexible display module DM. As shown in FIG. 2B, the support blocks SB are independently operated and at least partially separated from each other in the second/rolled-up mode to allow the flexible display module DM to be rolled-up (e.g., into a given shape).

In the present exemplary embodiment, the roller RL has a polygonal column shape with n side surfaces SS (n being a natural number equal to or greater than 3, such as 6). The term "polygonal column shape" used herein should not be interpreted to limit the shape of the roller RL such that each side surface SS is limited to a flat surface. Although recesses or protrusions may be provided on the n side surfaces SS of the roller RL, an overall shape of the roller RL may be described as a polygonal column shape. In addition, a shape in which an inside portion of the column of the roller RL is hollow may be included in the polygonal column shape.

FIGS. 2A and 2B show the roller RL having a hexagonal column shape as a representative example. The roller RL may include various materials (e.g., a plastic substance, a metallic substance, a magnetic substance, etc.).

As shown in FIGS. 2A to 2D, the support blocks SB are located on the rear surface LS of the flexible display module DM. The support blocks SB may be independently coupled to the rear surface LS of the flexible display module DM. In the present exemplary embodiment, each support block SB has a substantially rectangular plate shape. The support blocks SB may include a plastic substance, a metallic substance, or a magnetic substance, but they should not be limited thereto or thereby. The support blocks SB may be coupled to a buffer member, and the buffer member may be coupled to the rear surface LS of the flexible display module DM.

The support blocks SB are grouped into a plurality of m support block groups SB1 to SBm (m is a natural number). Each of the support block groups SB1 to SBm includes the support blocks SB arranged along a direction crossing a rolling axis. For example, the rolling axis may correspond to the second direction DR2, in which the roller extends, and the direction crossing the rolling axis may correspond to the first direction.

In the first/unrolled mode, a first support block group SB1 of the support block groups SB1 to SBm is located closest of the support blocks SB to the roller RL, and an m-th support block group SBm is located farthest from the roller RL. Among the support blocks SB1-1 to SB1-5 of the first support block group SB1, a first support block SB1-1 may be coupled to the roller RL.

As shown in FIG. 2C, the support blocks SB have different respective widths W1 to Wm in the first direction DR1. The support blocks SB included in the same one of the support block groups SB1-1 to SB1-5 may have the same width as each other.

Among the support blocks SB, the support blocks SB1-1 to SB1-5 of the first support block group SB1 have a smallest width W1, and the support blocks SBm-1 to SBm-6 of the m-th support block group SBm have a largest width Wm.

The widths W1 to Wm of the support blocks SB may gradually increase from the first support block group SB1 to the m-th support block group SBm.

In the present exemplary embodiment, the support blocks SB of each of the support block groups SB1 to SBm may have different widths within different respective ranges. For instance, the support blocks SB1-1 to SB1-5 of the first support block group SB1 have a width in a first range, the support blocks SB2-1 to SB2-6 of the second support block group SB2 have a width in a second range that is greater than the first range, etc.

In detail, when the support blocks SB1-1 to SB1-5 of the first support block group SB1 have a width from about 1 cm to about 1.3 cm, the support blocks SB2-1 to SB2-6 of the second support block group SB2 have a width from about 1.5 cm to about 1.8 cm, and the width range may incrementally increase from the first support block group SB1 to the m-th support block group SBm.

In the present exemplary embodiment, the support blocks SB1-1 to SB1-5 of the first support block group SB1 may have different widths, and the support blocks SB2-1 to SB2-6 of the second support block group SB2 may have different widths. In this case, each of the support blocks SB2-1 to SB2-6 of the second support block group SB2 has the width greater than that of a corresponding support block of the support blocks SB1-1 to SB1-5 of the first support block group SB1. Here, the corresponding support blocks included in different support block groups are configured to overlap each other in the second/rolled-up mode, as shown in FIG. 2B. The support blocks of the first to m-th support block groups SB1 to SBm may be classified into corresponding groups according to the rolling shape of the support blocks SB, or according to positions/arrangement order of the support blocks SB in the support block group.

Referring to FIG. 2D, a length of the support blocks SB in the second direction DR2 may be substantially the same as that of the display module DM. This is because the support blocks SB sufficiently support the display module DM.

The support blocks SB2-1 to SB2-6 of the second support block group SB2 rolled up on the roller RL in the second/rolled-up mode define a hexagonal shape that is greater than a shape defined by the support blocks SB1-1 to SB1-5 of the first support block group SB1. The hexagonal shape increases in size from the first support block group SB1 to the m-th support block group SBm. Accordingly, the flexible display module DM is regularly rolled to be stowed.

When the roller RL has the polygonal column shape with n side surfaces SS (refer to FIG. 2A), each of the support block groups SB1 to SBm includes n support blocks (although the first support block group SB1 of the present embodiment may have less than n support blocks). To allow the support blocks SB of each of the support block groups SB1 to SBm to define the same hexagonal shape as that of the roller RL, each of the support block groups SB1 to SBm includes n support blocks that are the same in number as the side surfaces SS of the roller RL (although the first support block group SB1 of the present embodiment may have less than n support blocks).

As shown in FIGS. 2A to 2D, when the roller RL has the hexagonal column shape, each of the support block groups SB1 to SBm includes six support blocks except for the first support block group SB1. That is, the first support block group SB1 located closest to the roller RL among the support block groups SB1 to SBm includes (n-1) support blocks SB1-1 to SB1-5.

As shown in FIG. 2B, the support blocks SB1-1 to SB1-5 of the first support block group SB1 and a first support block SB2-1 of the second support block group SB2 define a polygonal shape, or spiral, in the second/rolled-up mode. Because the first support block group SB1 includes the (n−1) support blocks, which are fewer in number than the support blocks SB of other support block groups SB2 to SBm, the smallest polygonal shape defined by each of the support block groups SB1 to SBm is closest to the roller RL. Therefore, the polygonal shapes defined by other support block groups SB2 to SBm may be larger. However, it should be noted that the first support block group SB1 may include n support blocks according to other embodiments.

As shown in FIG. 2B, the roller RL includes a magnetic substance, and the support blocks SB include a metallic substance to stably maintain the rolled-up state of the support blocks SB in the second/rolled-up mode. In this case, the rolled-up shape of the flexible display module DM and the support blocks SB may be stably maintained, or held, by a magnetic force between the roller RL and the support blocks SB.

Figure 3A:
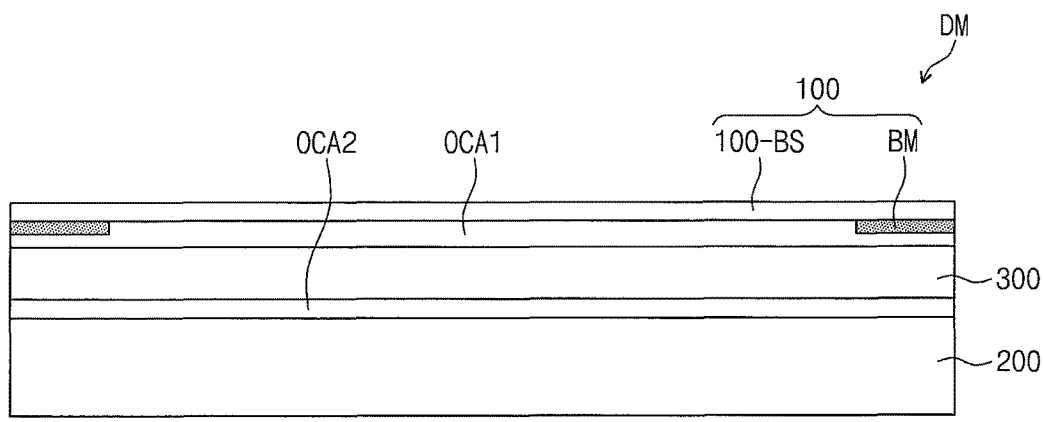
FIG. 3A is a cross-sectional view showing a flexible display module according to an exemplary embodiment of the present disclosure.
Figure 3B:
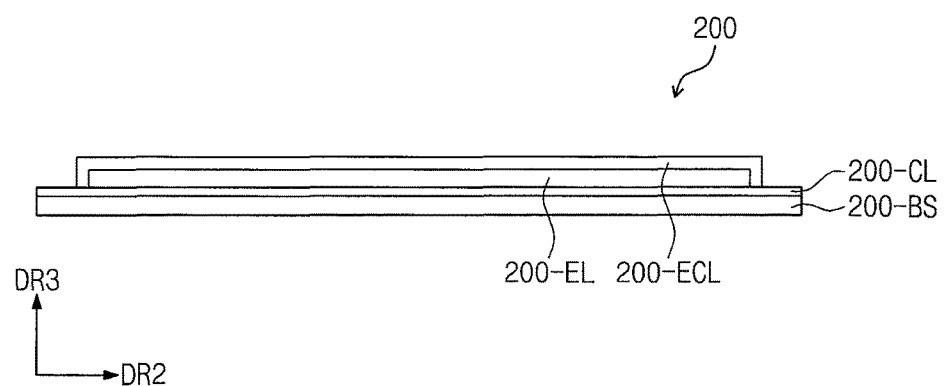
FIG. 3B is a cross-sectional view showing a flexible display panel according to an exemplary embodiment of the present disclosure.

FIG. 3A is a cross-sectional view showing a flexible display module according to an exemplary embodiment of the present disclosure, and FIG. 3B is a cross-sectional view showing a flexible display panel according to an exemplary embodiment of the present disclosure.

Referring to FIG. 3A, the flexible display module DM includes a window member 100, a display panel 200, and a touch panel 300. The flexible display module DM may further include an optical member (e.g., a retardation plate, a polarization plate, etc.).

The window member 100 includes a base member 100-BS and a black matrix BM. The black matrix BM is located at a rear surface of the base member 100-BS to define a non-display area. The base member 100-BS may include a glass substrate, a sapphire substrate, or a plastic film. The black matrix BM may be formed of a colored organic layer through a coating method. Additionally, the window member 100 may further include a functional coating layer located at an entire surface of the base member 100-BS. The functional coating layer may include an anti-fingerprint layer, an anti-reflection layer, a hard coating layer, etc.

The display panel 200 is configured to display the image IM (refer to FIG. 1) corresponding to image data input thereto. The display panel 200 may be, but is not limited to, an organic light emitting display panel that will be described later in detail.

The touch panel 300 is configured to obtain coordinate information of a position at which a touch event occurs. The touch panel 300 may be, for example, a resistive film type touch panel, an electrostatic capacitive type touch panel, or an electromagnetic induction type touch panel.

The window member 100 and the touch panel 300 may be coupled to each other by an optically clear adhesive film OCA1, and the touch panel 300 and the display panel 200 may also be coupled to each other by an optically clear adhesive film OCA2. In the present exemplary embodiment, one of the two optically clear adhesive films OCA1 and OCA2 may be omitted. For instance, when the display panel 200 and the touch panel 300 are manufactured through consecutive processes, the touch panel 300 may be directly on the display panel 200.

Referring to FIG. 3B, the display panel 200 may include a base member 200-BS, a circuit layer 200-CL, a device layer 200-EI and an encapsulation layer 200-ECL. The support blocks SB (refer to FIGS. 2A to 2D) may be coupled to a rear surface of the base member 200-BS.

The base member 200-BS includes at least one plastic film, and may include two plastic films along with inorganic layers, a silicon nitride layer and/or a silicon oxide layer, which may be located between the two plastic films. The base member 200-BS includes at least one of polyimide (PI), polyethyleneterephthalate (PET), polyethylenenaphthalate (PEN), polyethersulphone (PES), and/or fiber reinforced plastic (FRP).

The circuit layer 200-CL includes a plurality of signal lines and electronic devices, which are located on the display panel 200. In addition, the circuit layer 200-CL includes a plurality of insulating layers to insulate the signal lines from the electronic devices. The circuit layer 200-CL includes circuits for the pixel (e.g., at least one thin film transistor and a capacitor).

The device layer 200-EL includes display devices (e.g., organic light emitting diodes), and may further include elements supporting the organic light emitting diode.

The encapsulation layer 200-ECL seals the device layer 200-EL, and includes one or more inorganic thin layers or one or more organic thin layers. In the present exemplary embodiment, the encapsulation layer 200-ECL may be replaced with an encapsulation substrate.

Figure 4A:
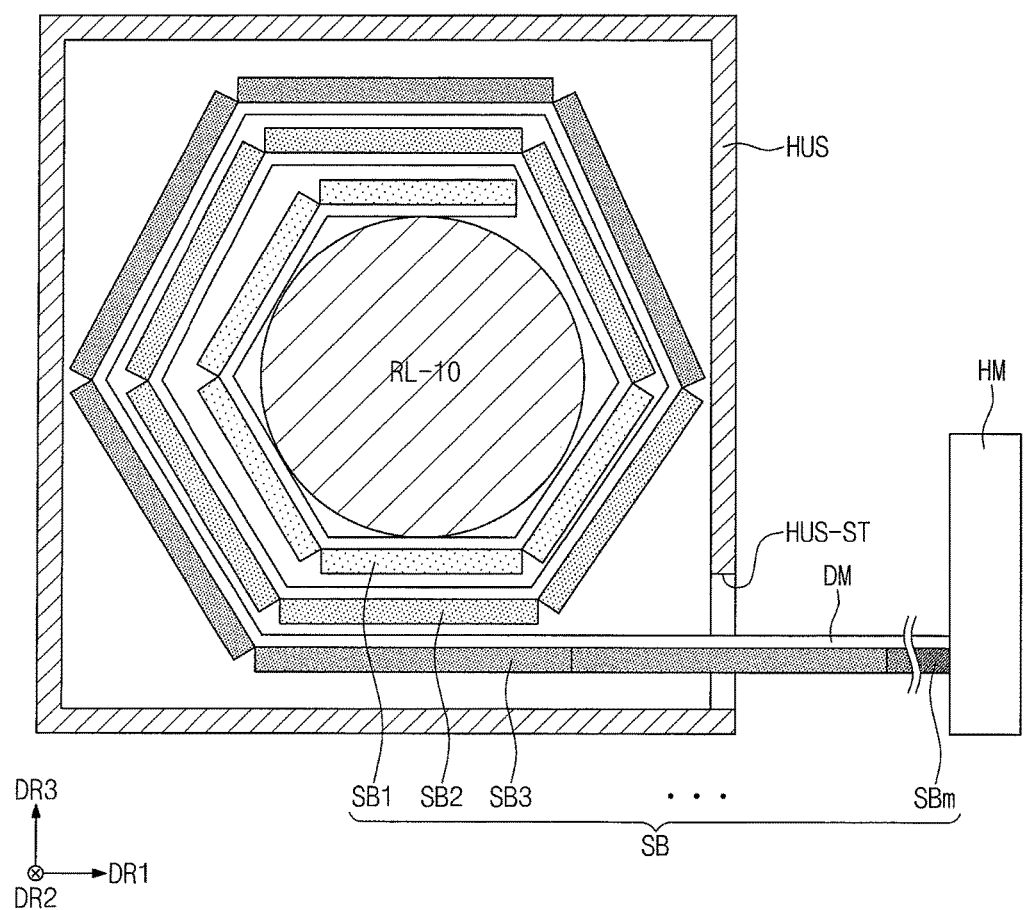
FIGS. 4A and 4B are side views showing a rollable display device in a rolled-up state according to an exemplary embodiment of the present disclosure.
Figure 4B:
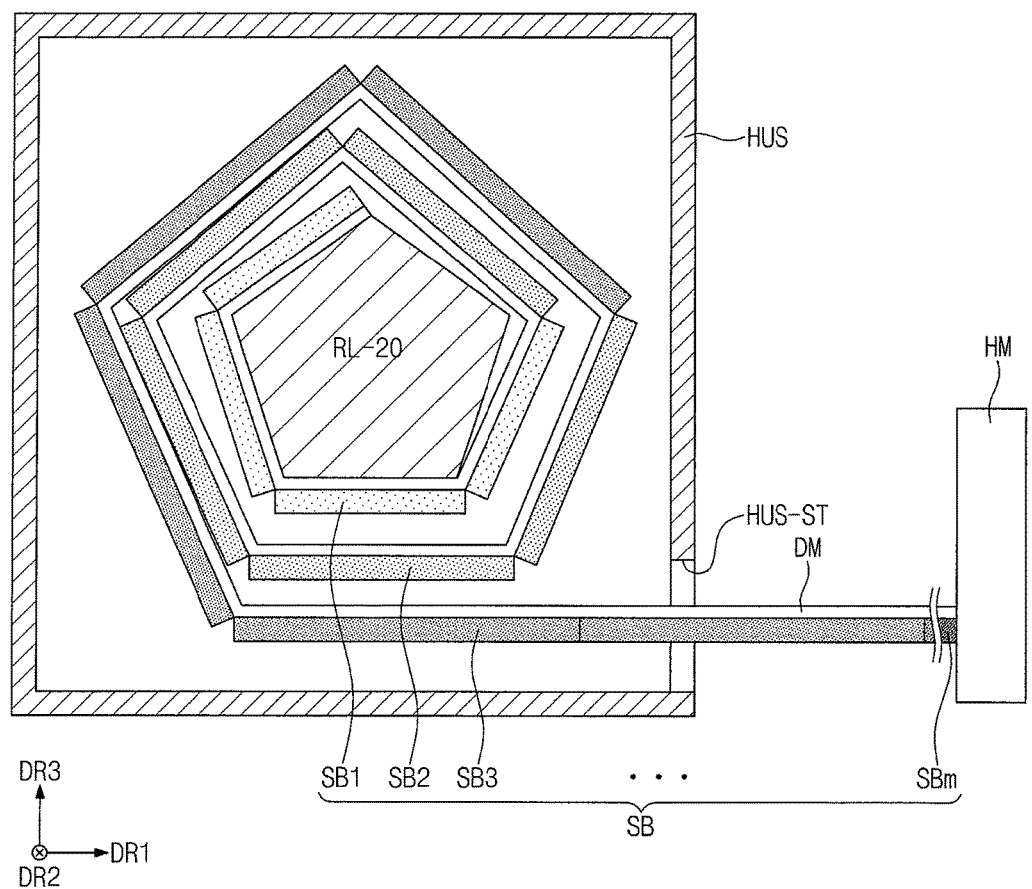

FIGS. 4A and 4B are side views showing a rollable display device in a rolled-up state according to an exemplary embodiment of the present disclosure. In FIGS. 4A and 4B, the same reference numerals denote the same elements in FIGS. 1 to 3B, and thus detailed descriptions of the same elements will be omitted.

Referring to FIG. 4A, different from the roller RL described above (refer to FIGS. 2A to 2D), a roller RL-10 according to the present exemplary embodiment may have a substantially cylindrical shape. Referring to FIG. 4A, although the roller RL-10 is cylindrically shaped, each of the support block groups SB1 to SBm collectively defines a corresponding polygonal shape in the second/rolled-up mode. This is because the support block groups SB1 to SBm include substantially the same number of support blocks SB, and the support blocks SB of each of the support block groups SB1 to SBm have different widths from each other.

Referring to FIG. 4A, different from the roller RL described with reference to FIGS. 2A to 2D, a roller RL-20 according to the present exemplary embodiment may have a polygonal shape with an odd number of side surfaces SS. Referring to FIG. 4B, the roller RL-20 has a pentagonal column shape. The support blocks SB of each of the support block groups SB1 to SBm define the pentagonal shape in the second/rolled-up mode.

Figure 5A:
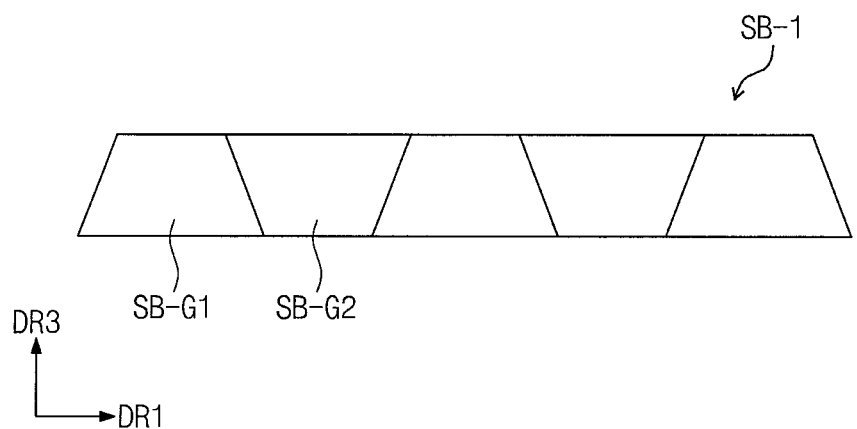
FIGS. 5A to 5C are side views showing support blocks according to an exemplary embodiment of the present disclosure.
Figure 5B:
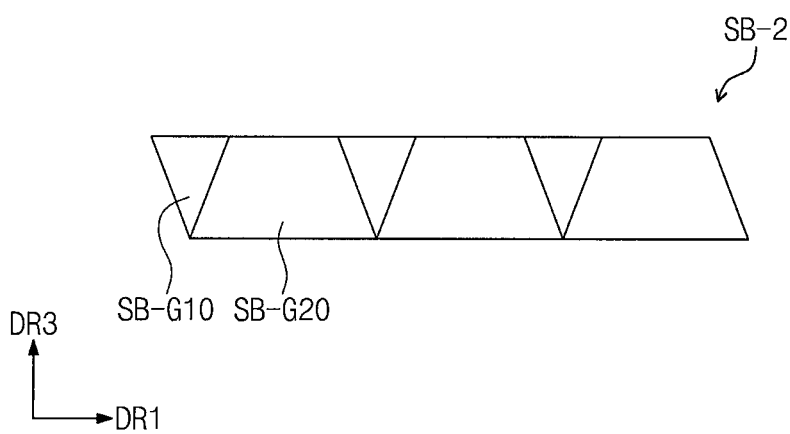
Figure 5C:
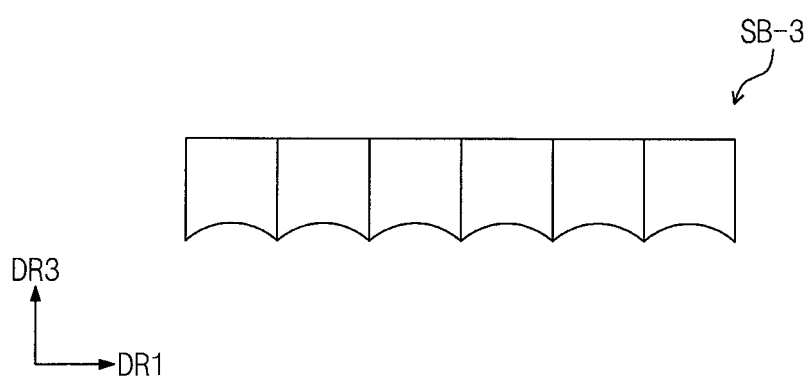

FIGS. 5A to 5C are side views showing support blocks according to an exemplary embodiment of the present disclosure. FIGS. 5A to 5C show support blocks SB included in support block groups SB-1, SB-2, and SB-3, respectively. In FIGS. 5A to 5C, the same reference numerals denote the same elements in FIGS. 1 to 3B, and thus detailed descriptions of the same elements will be omitted.

As described above, the support blocks SB making contact with each other in the first/unrolled mode may have a substantially rectangular plate shape. As shown in FIGS. 5A to 5C, the shape of the support blocks may be changed while two adjacent support blocks still make contact with each other in the second/rolled-up mode.

Referring to FIG. 5A, the support block group SB-1 includes two kinds of support blocks SB-G1 and SB-G2. One support block SB-G1 of the two support blocks SB-G1 and SB-G2 has a cross-sectional isosceles trapezoid shape when viewed in the second direction DR2, and the other support block SB-G2 of the two support blocks SB-G1 and SB-G2 has a similar shape to the first support block SB-G1, although the cross-sectional isosceles trapezoid shape is inverted with respect to the third direction DR3. The two support blocks SB-G1 and SB-G2 have substantially the same height, or thickness, in the third direction DR3, and are alternately arranged with each other.

Referring to FIG. 5B, the support block group SB-2 includes two kinds of support blocks SB-G10 and SB-G20. One support block SB-G10 of the two support blocks SB-G10 and SB-G20 has a cross-sectional triangular shape when viewed from second direction DR2, and the other support block SB-G20 of the two support blocks SB-G10 and SB-G20 has a cross-sectional isosceles trapezoid shape when viewed from the second direction DR2. The two support blocks SB-G10 and SB-G20 have substantially the same height, or thickness, in the third direction DR3. The two support blocks SB-G10 and SB-G20 are alternately arranged with each other.

Referring to FIG. 5C, the support block group SB-3 includes support blocks each having a shape deformed from the rectangular plate shape. A cross-section of each of the support blocks, when viewed from the second direction DR2, includes an upper surface, two substantially parallel side surfaces, and a lower surface opposite the upper surface that is curved.

Figure 6A:
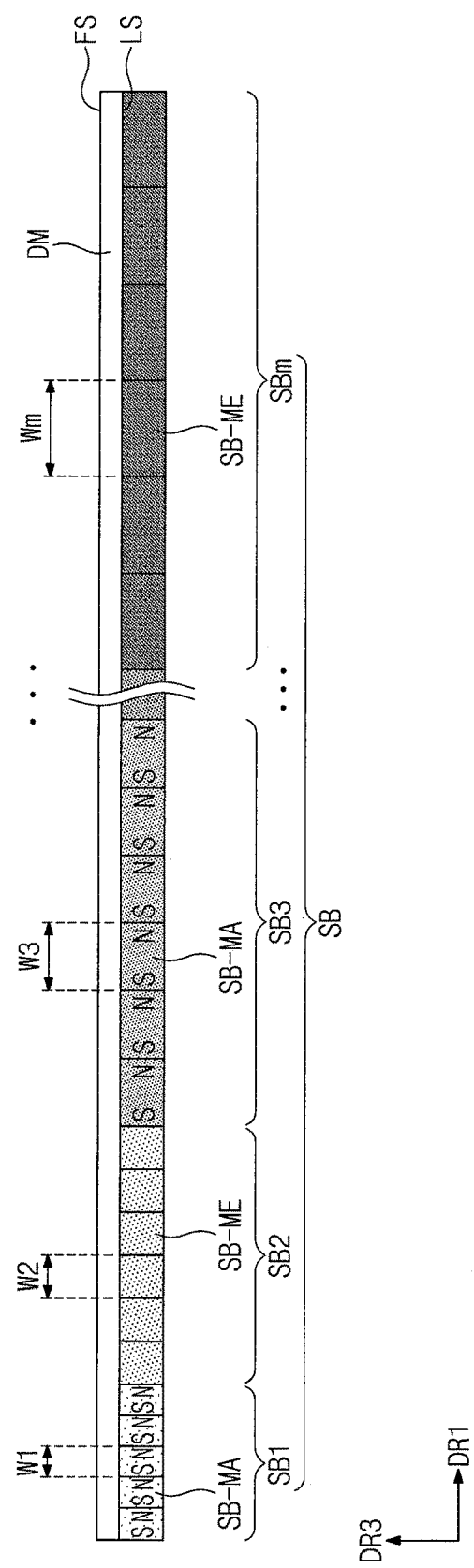
FIG. 6A is a view showing a portion of the rollable display device in an unrolled state according to an exemplary embodiment of the present disclosure.
Figure 6B:
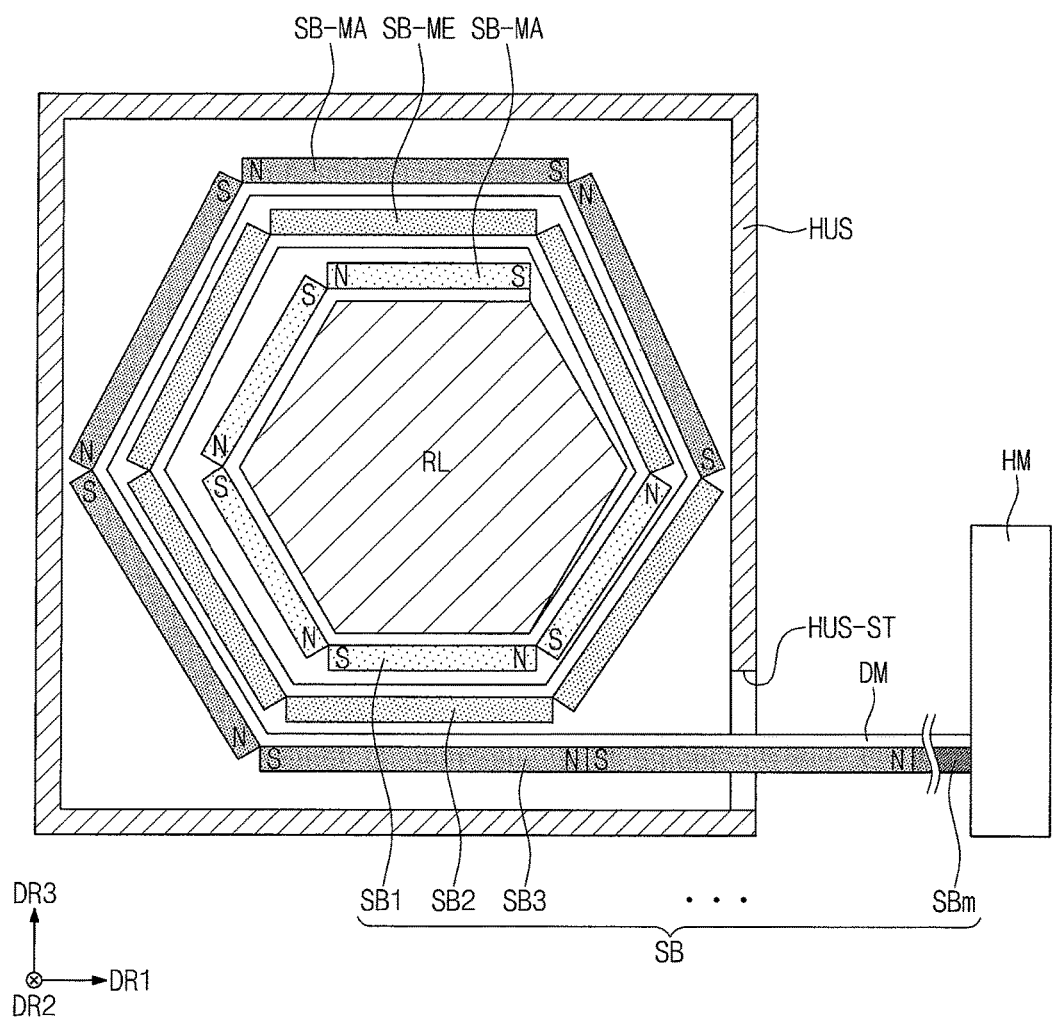
FIG. 6B is a view showing a portion of the rollable display device in a rolled-up state according to an exemplary embodiment of the present disclosure.

FIG. 6A is a view showing a portion of the rollable display device in an unrolled state according to an exemplary embodiment of the present disclosure, and FIG. 6B is a view showing a portion of the rollable display device in a rolled-up state according to an exemplary embodiment of the present disclosure. In FIGS. 6A and 6B, the same reference numerals denote the same elements in FIGS. 1 to 5C, and thus detailed descriptions of the same elements will be omitted.

Referring to FIGS. 6A and 6B, the support block groups SB1 to SBm include magnetic support block groups and metallic support block groups. For instance, the magnetic support block groups correspond to odd-numbered support block groups SB1 and SB3 among the support block groups SB1 to SBm, and the metallic support block groups correspond to even-numbered support block groups SB2 and SBm among the support block groups SB1 to SBm.

Support blocks SB-MA of the magnetic support block groups SB1 and SB3 include a magnetic substance, and at least a portion thereof may be the magnetic substance. Support blocks SB-ME of the metallic support block groups SB2 and SBm include a metallic substance, and at least a portion thereof may be the metallic substance.

The support blocks SB-MA of the magnetic support block groups SB1 and SB3 make contact with each other in the first/unrolled mode and are stably coupled to each other by the magnetic force. The support blocks SB-MA of the magnetic support block groups SB1 and SB3 are coupled to the support blocks SB-ME of the metallic support block groups SB2 and SBm by the magnetic force in the second/rolled-up mode.

Figure 7:
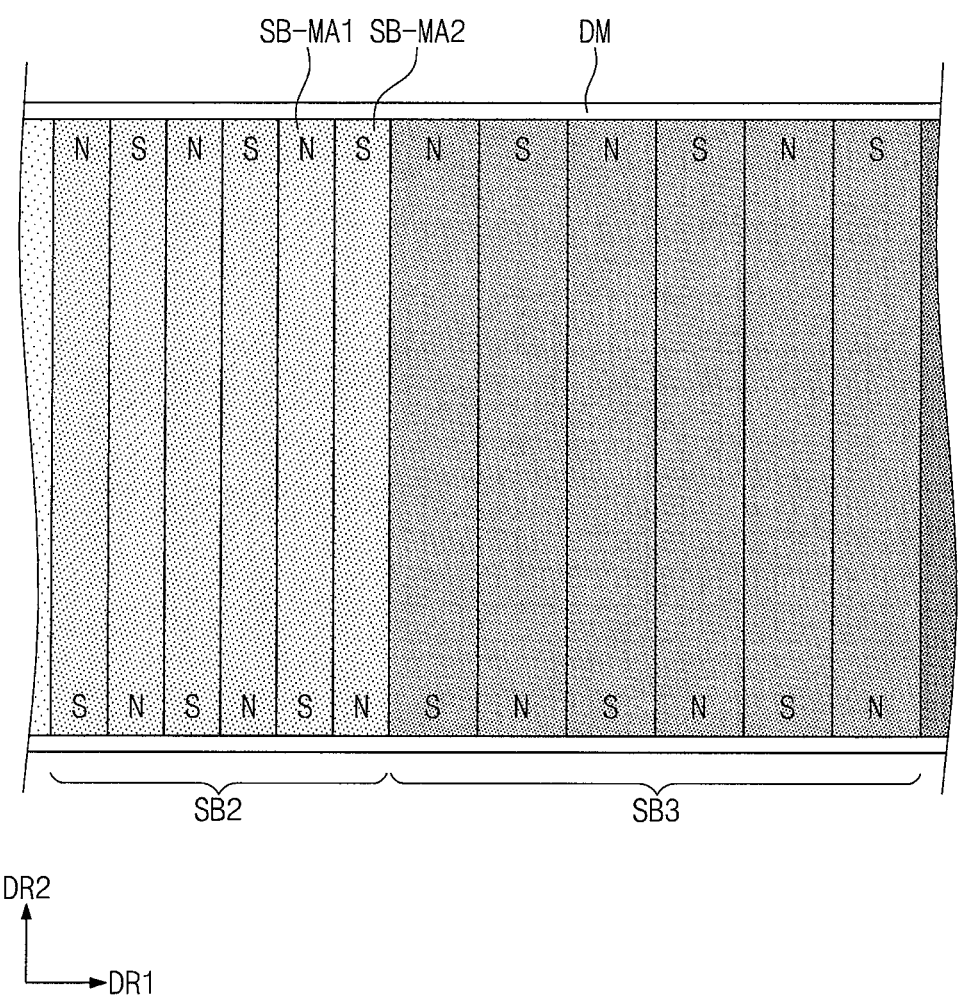
FIGS. 7 to 9 are views showing portions of the rollable display device in an unrolled state according to an exemplary embodiment of the present disclosure.
Figure 8:
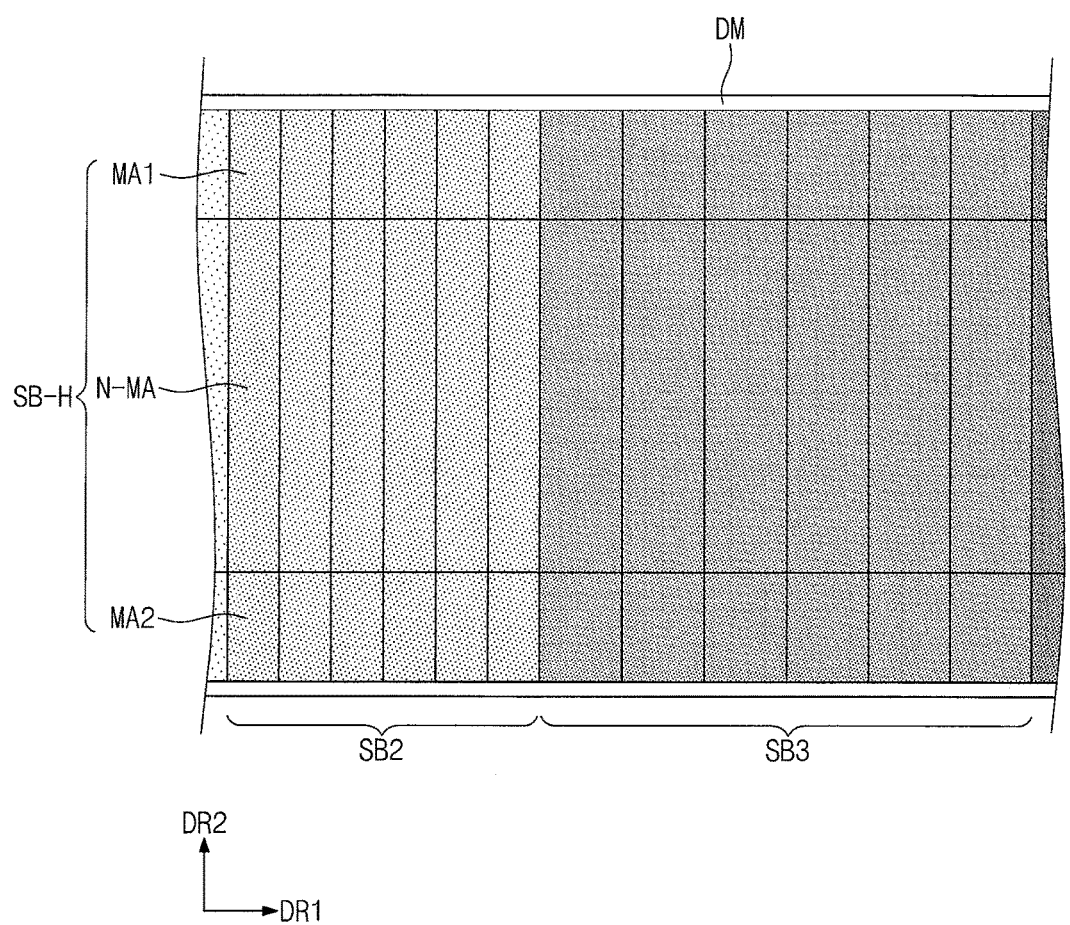
Figure 9:
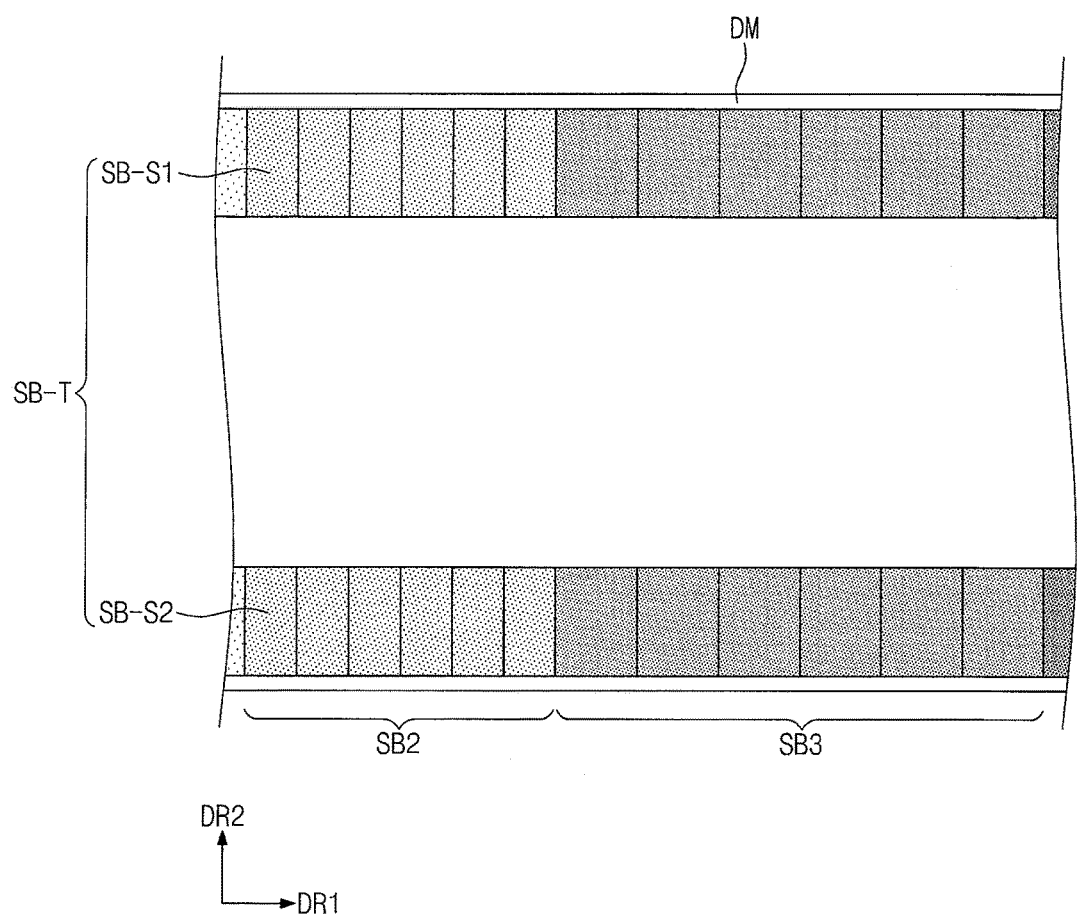

FIGS. 7 to 9 are views showing portions of the rollable display device in an unrolled state according to an exemplary embodiment of the present disclosure. In FIGS. 7 to 9, the same reference numerals denote the same elements in FIGS. 1 to 6B, and thus detailed descriptions of the same elements will be omitted.

FIGS. 7 to 9 show two consecutive support block groups. Among the support block groups SB1 to SBm, the second and third support block groups SB2 and SB3 will be described in detail as respective representative examples of the even-numbered and odd-numbered support block groups. The even-numbered support block groups have substantially the same structure as that of the second support block group SB2, and the odd-numbered support block groups have substantially the same structure as that of the third support block group SB3 (e.g., with the exception of width, etc.).

Referring to FIG. 7, each of the support blocks of the second support block group SB2 includes a magnetic substance, and each of the support blocks of the third support block group SB3 includes a magnetic substance. The second and third support block groups SB2 and SB3 include two kinds of magnetic support blocks SB-MA1 and SB-MA2 alternately arranged with each other. The first magnetic support blocks SB-MA1 have a magnetic arrangement opposite to that of the second magnetic support blocks SB-MA2 with respect to the rolling axis (i.e., the second direction DR2). That is, the magnetic poles of the magnetic support blocks SB-MA1 and SB-MA2 alternate with respect to the second direction DR2, and adjacent ones of magnetic support blocks SB-MA1 and SB-MA2 have opposite magnetic poles with respect to the second direction.

Referring to FIG. 8, each of support blocks SB-H of the second and third support block groups SB2 and SB3 includes two magnetic portions MA1 and MA2 and a non-magnetic portion N-MA. The two magnetic portions MA1 and MA2 are spaced apart from each other in the second direction DR2, and located on opposite sides of the non-magnetic portion N-MA that is located therebetween, the non-magnetic portion N-MA including a metallic substance.

Referring to FIG. 9, each of support blocks SB-T of the second and third support block groups SB2 and SB3 includes a first support portion SB-S1 and a second support portion SB-S2, which are spaced apart from each other in the second direction DR2. Each of the first and second support portions SB-S1 and SB-S2 of each of the support blocks SB-T may include a magnetic substance. Among the first support portions SB-S1 of the support blocks SB-T arranged in the first direction DR1, a portion of the first support portions SB-S1 includes the magnetic substance, and another portion of, or the remainder of, the first support portions SB-S1 includes a non-magnetic substance (e.g., a metal material). Among the second support portions SB-S2 of the support blocks SB-T arranged in the first direction DR1, a portion of the second support portions SB-S2 includes the magnetic substance, and another portion of, or the remainder of, the second support portions SB-S2 includes the non-magnetic substance (e.g., the metal material).

Figure 10A:
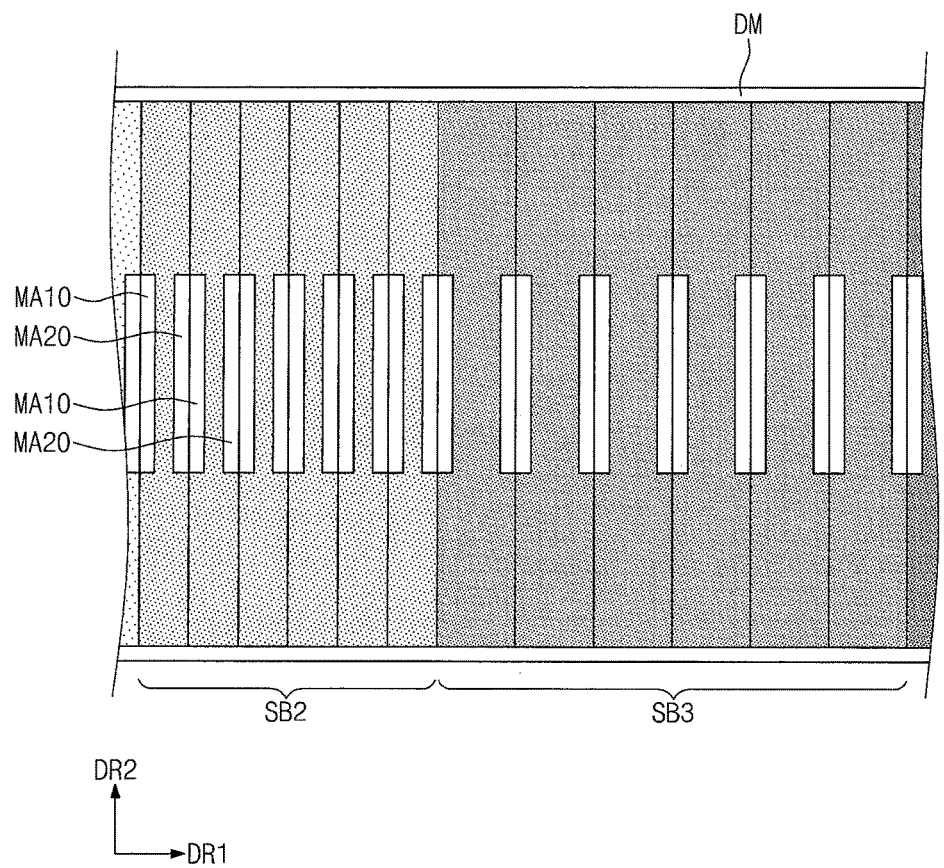
FIGS. 10A and 10B are views showing portions of the rollable display device in an unrolled state according to an exemplary embodiment of the present disclosure.
Figure 10B:
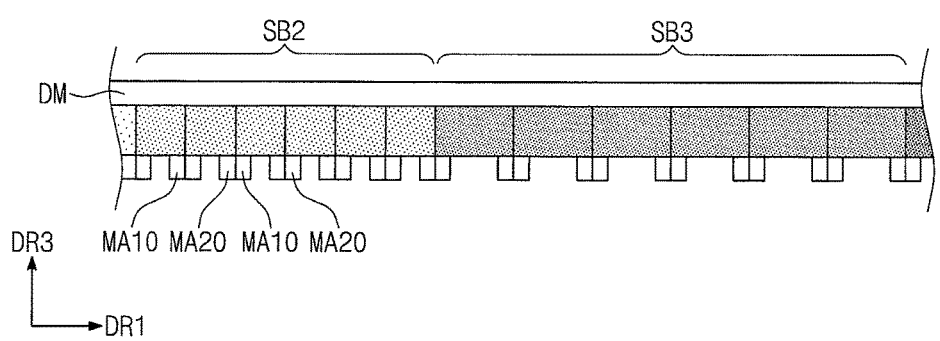

FIGS. 10A and 10B are views showing portions of the rollable display device in an unrolled state according to an exemplary embodiment of the present disclosure. In FIGS. 10A and 10B, the same reference numerals denote the same elements in FIGS. 1 to 9, and thus detailed descriptions of the same elements will be omitted.

FIGS. 10A and 10B show two consecutive support block groups. Among the support block groups SB1 to SBm, the second and third support block groups SB2 and SB3 will be described in detail as respective representative examples of the even-numbered and odd-numbered support block groups. The even-numbered support block groups have substantially the same structure as that of the second support block group SB2, and the odd-numbered support block groups have substantially the same structure as that of the third support block group SB3 (e.g., with the exception of width, etc.).

Each of the second and third support block groups SB2 and SB3 includes non-magnetic support blocks, such as plastic support blocks or metal support blocks. However, the support blocks of the second and third support block groups SB2 and SB3 may include magnetic substances. As shown in FIGS. 10A and 10B, two magnetic substances MA10 and MA20 that are spaced from each other may be located on the rear surface of each the support blocks. Each of the magnetic substances MA10 and MA20 has an area smaller than that of a corresponding support block of the support blocks. Accordingly, the magnetic substances MA10 and MA20 of adjacent support blocks may be magnetically coupled in the first/unrolled mode.

Figure 11A:
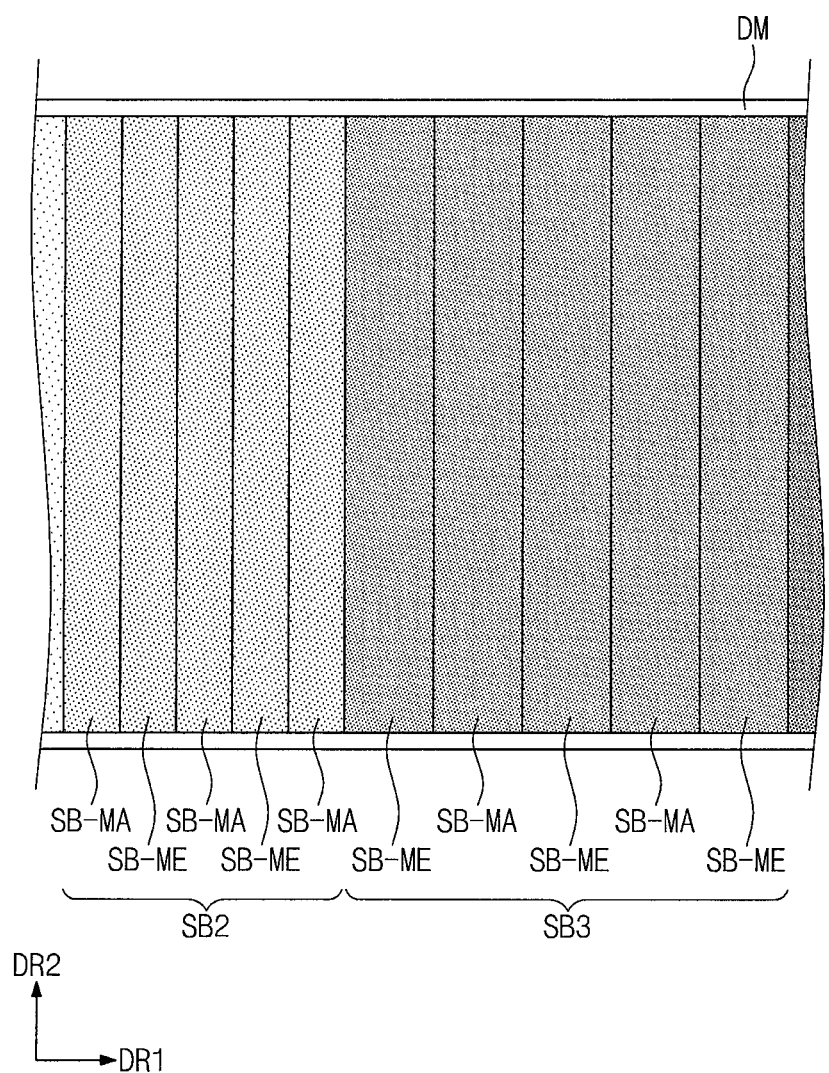
FIG. 11A is a view showing a portion of the rollable display device in an unrolled state according to an exemplary embodiment of the present disclosure.
Figure 11B:
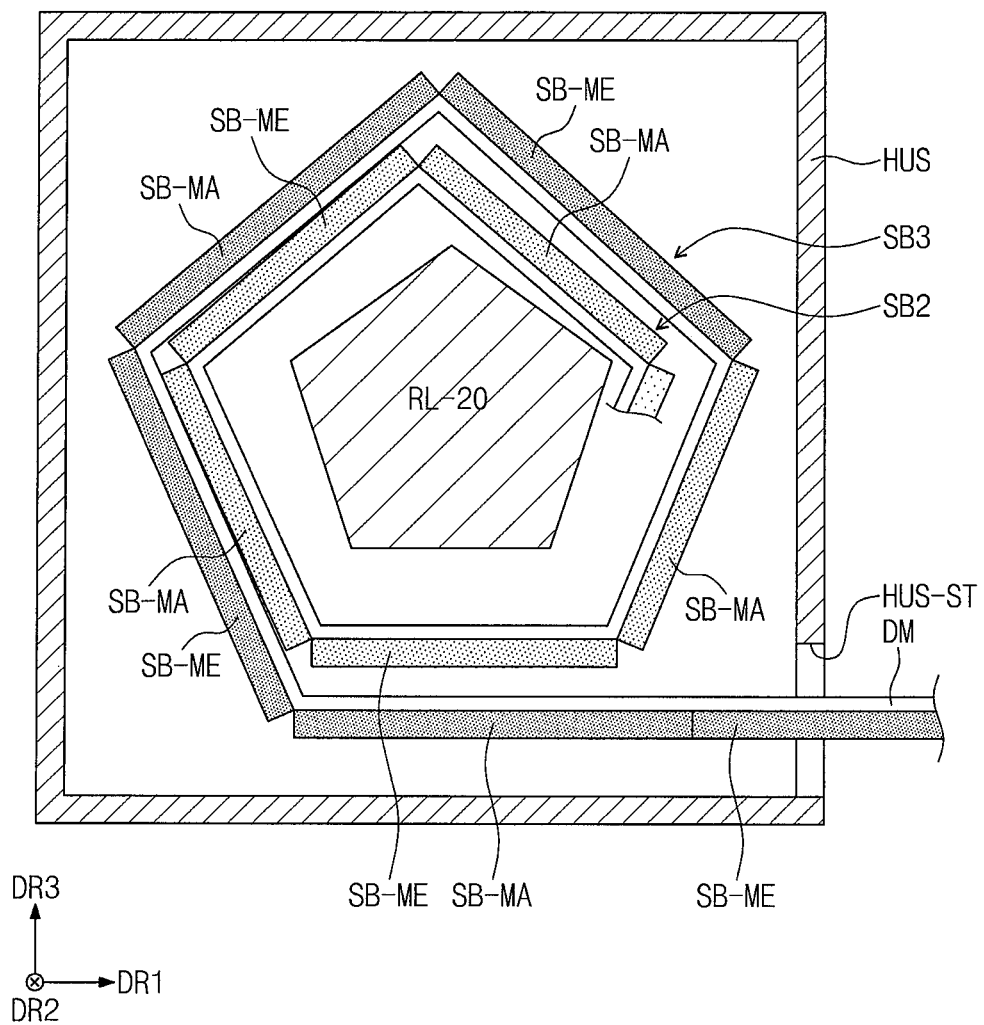
FIG. 11B is a view showing a portion of the rollable display device in a rolled-up state according to an exemplary embodiment of the present disclosure.

FIG. 11A is a view showing a portion of the rollable display device in an unrolled state according to an exemplary embodiment of the present disclosure, and FIG. 11B is a view showing a portion of the rollable display device in a rolled-up state according to an exemplary embodiment of the present disclosure. In FIGS. 11A and 11B, the same reference numerals denote the same elements in FIGS. 1 to 10B, and thus detailed descriptions of the same elements will be omitted.

FIGS. 11A and 11B show two consecutive support block groups. Among the support block groups SB1 to SBm, the second and third support block groups SB2 and SB3 will be described in detail as respective representative examples of the even-numbered and odd-numbered support block groups. The even-numbered support block groups have substantially the same structure as that of the second support block group SB2, and the odd-numbered support block groups have substantially the same structure as that of the third support block group SB3 (e.g., with the exception of width, etc.).

FIGS. 11A and 11B show a roller having a pentagonal column shape as an example of polygonal column shapes defined by an odd number (e.g., 2n−1, n is a natural number equal to or greater than 2) of side surfaces SS. Each of the second and third support block groups SB2 and SB3 includes two kinds of support blocks SB-MA and SB-ME. The first support blocks SB-MA are magnetic support blocks and the second support blocks SB-ME are non-magnetic support blocks. The non-magnetic support blocks SB-ME may be metal support blocks.

The second support block group SB2 includes the magnetic support block SB-MA and the non-magnetic support block SB-ME, which are alternately arranged with each other. The third support block group SB3 also includes the magnetic support block SB-MA and the non-magnetic support block SB-ME, which are alternately arranged with each other. Among the support blocks of the second support block group SB2 and the support blocks of the third support block group SB3, two adjacent support blocks (e.g., when the display device is in the unrolled state) may have different properties. One support block of the two adjacent support blocks is the magnetic support block SB-MA, and the other support block of the two adjacent support blocks is the metallic support block SB-ME.

Referring to FIG. 11B, the support blocks of the second support block group SB2 have different properties from those of corresponding support blocks of the third support block group SB3 in the second/rolled-up mode (e.g., opposing or inverted magnetic properties). Accordingly, a distortion caused by a repulsive force, which may be generated between magnetic support blocks (e.g., with aligned magnetic poles) that are overlapped with each other, may be prevented. In particular, when magnetic support blocks SB-MA of the third support block group SB3 overlap the metallic support blocks SB-ME of the second support block group SB2, an attractive magnetic force is generated between the support blocks of the second support block group SB2 and the corresponding support blocks of the third support block group SB3 when the display device is in the second/rolled-up mode.

The roller according to the present exemplary embodiment may have a polygonal column shape defined by an even number of side surfaces, and each of the second and third support block groups SB2 and SB3 may include two kinds of support blocks SB-MA and SB-ME, with the first support blocks SB-MA being magnetic support blocks and the second support blocks SB-ME being non-magnetic support blocks. The non-magnetic support blocks SB-ME may be metal support blocks, and the magnetic support blocks SB-MA may be alternately arranged with the non-magnetic support blocks SB-ME.

Figure 12A:
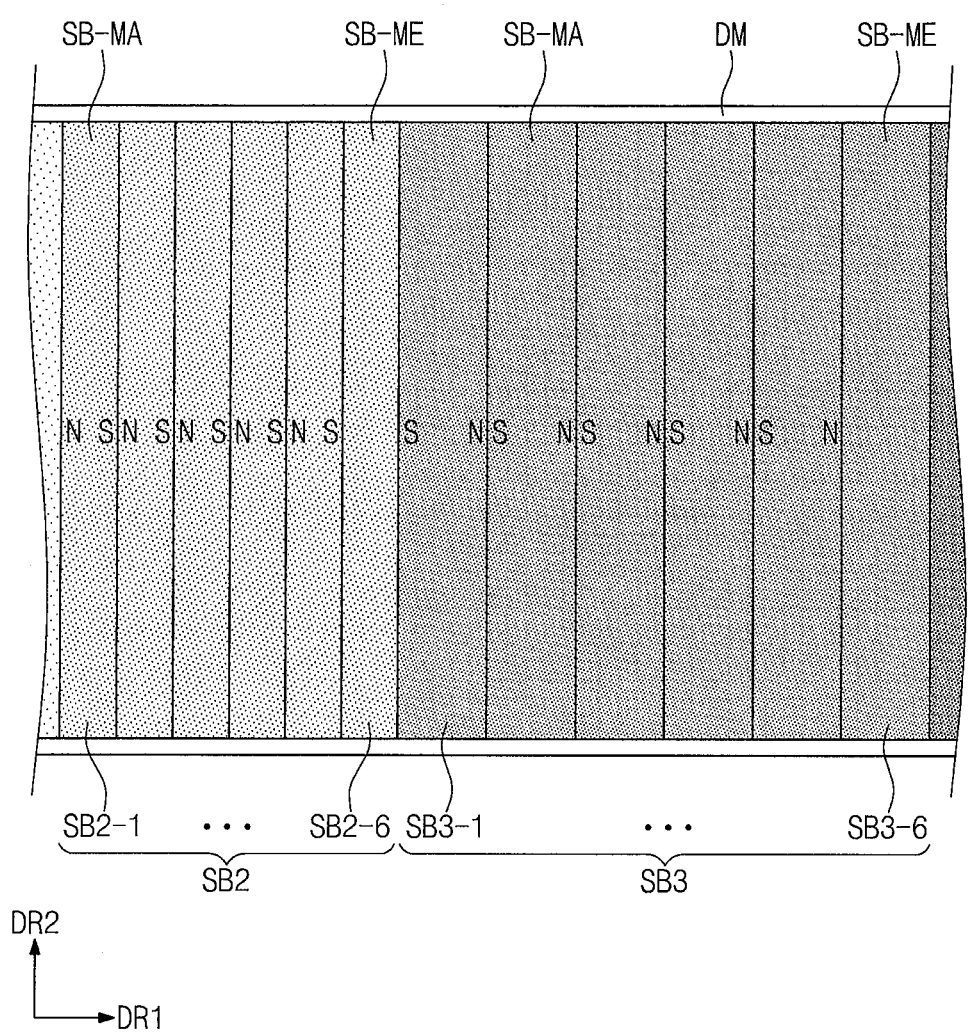
FIG. 12A is a view showing a portion of the rollable display device in an unrolled state according to an exemplary embodiment of the present disclosure.
Figure 12B:
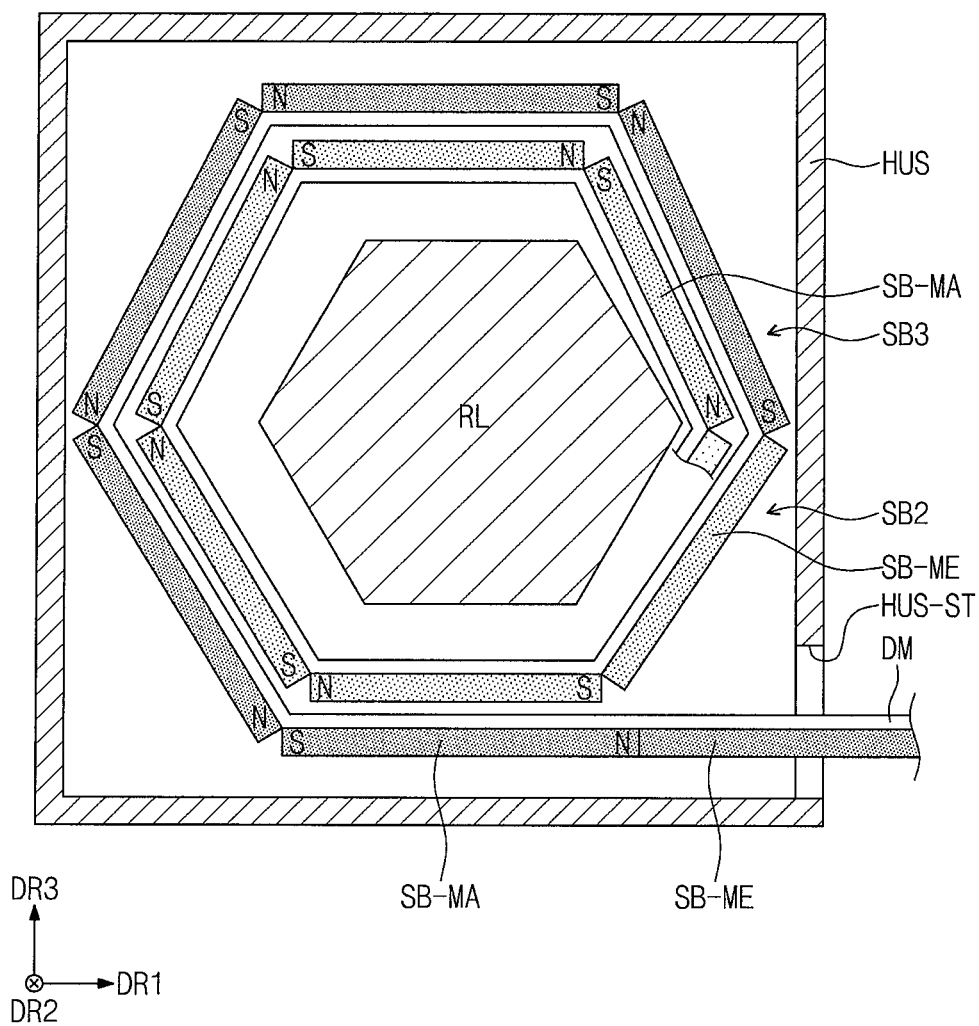
FIG. 12B is a view showing a portion of the rollable display device in a rolled-up state according to an exemplary embodiment of the present disclosure.
Figure 13A:
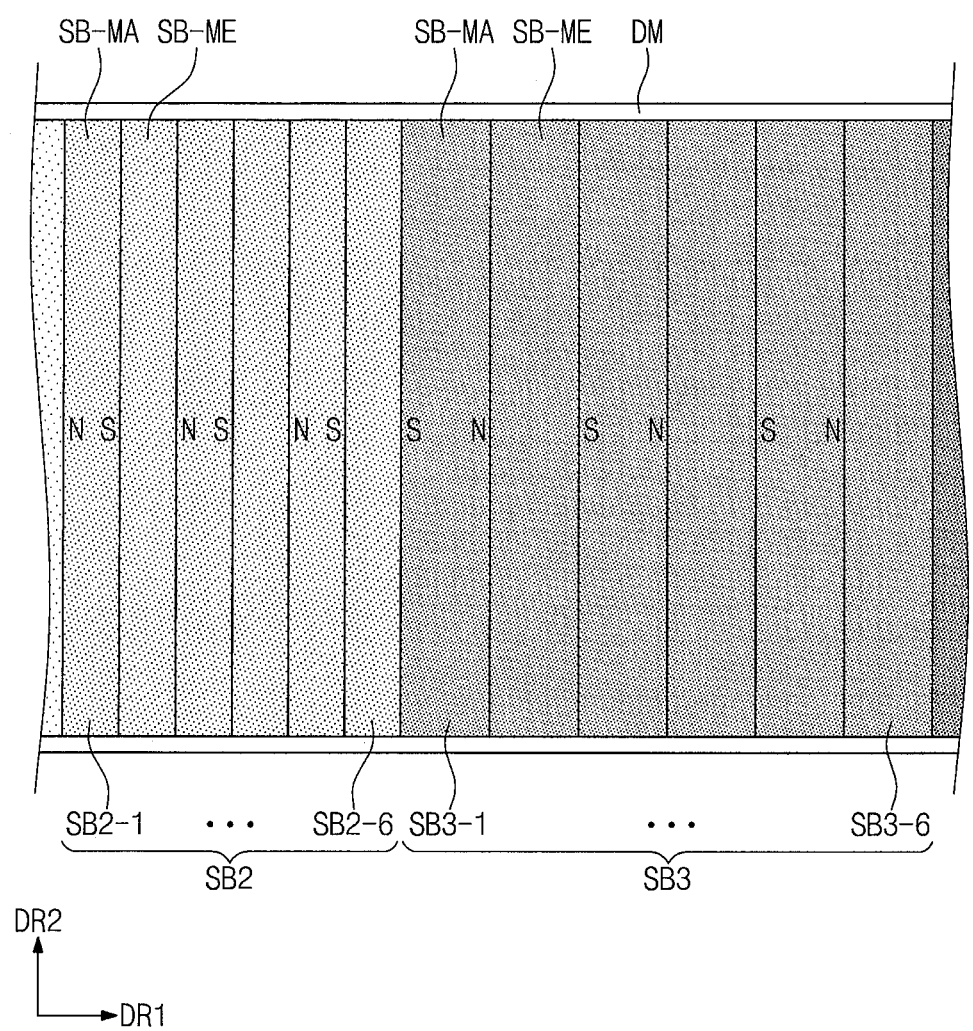
FIG. 13A is a view showing a portion of the rollable display device in an unrolled state according to an exemplary embodiment of the present disclosure.
Figure 13B:
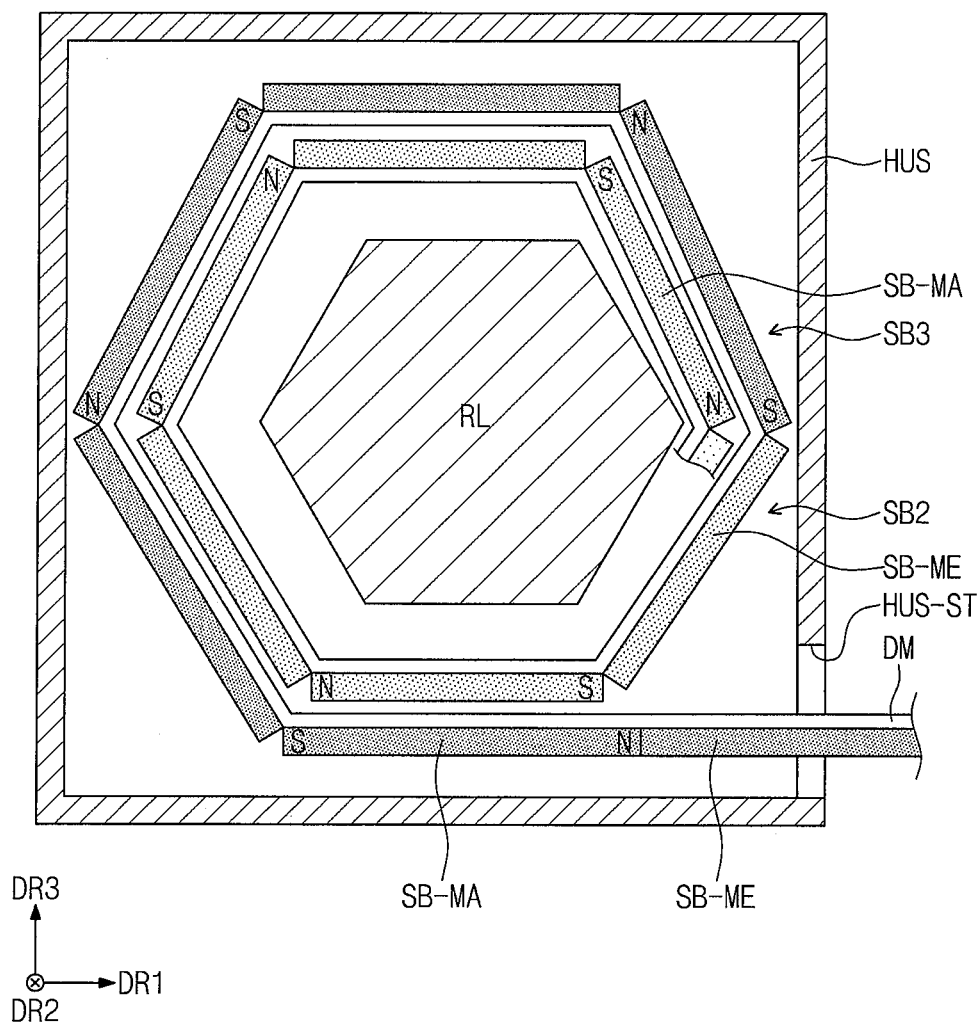
FIG. 13B is a view showing a portion of the rollable display device in a rolled-up state according to an exemplary embodiment of the present disclosure.
Figure 14A:
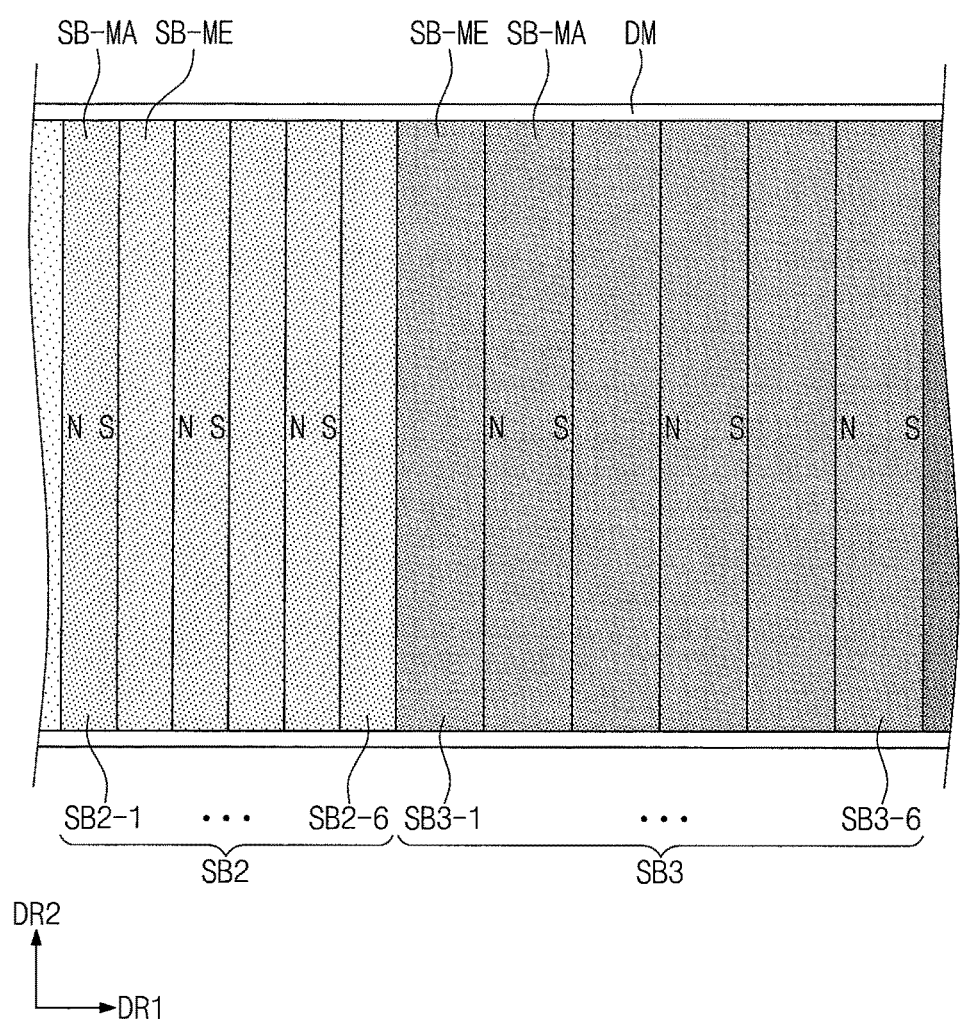
FIG. 14A is a view showing a portion of the rollable display device in an unrolled state according to an exemplary embodiment of the present disclosure.
Figure 14B:
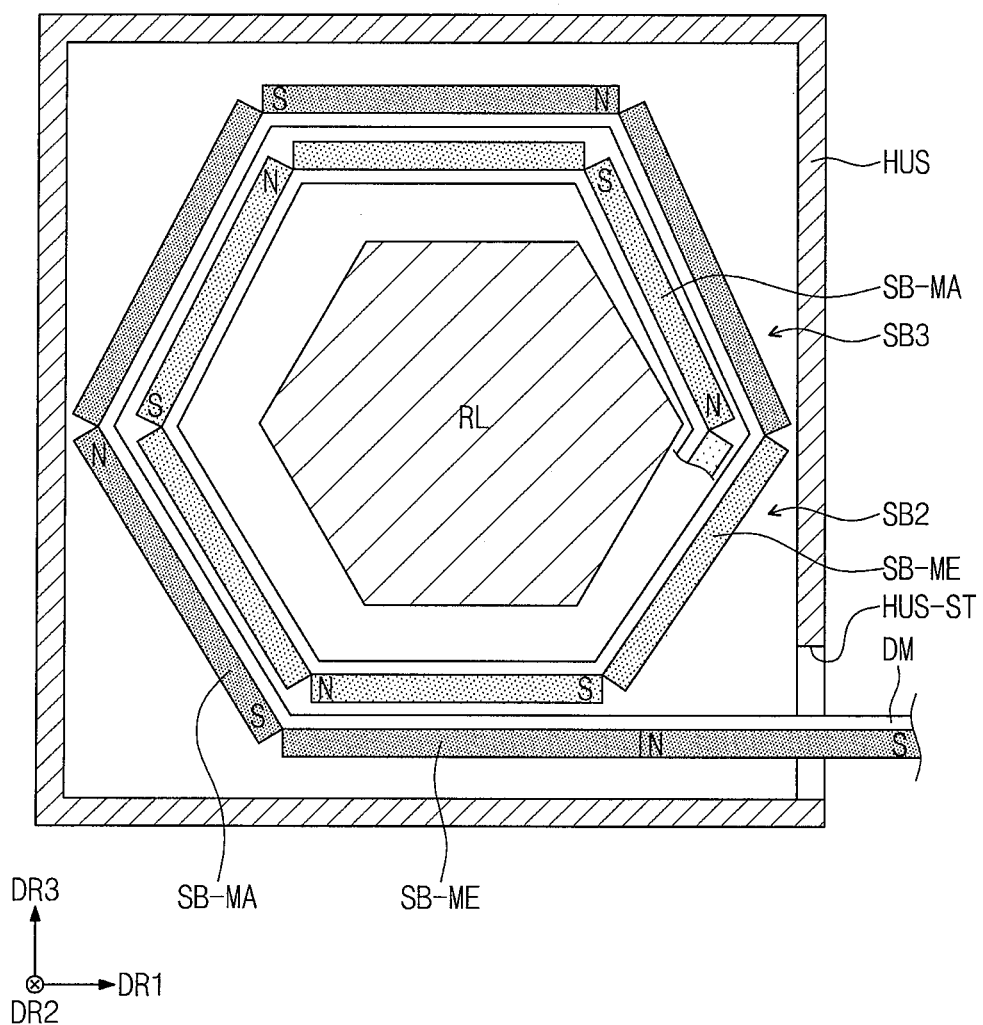
FIG. 14B is a view showing a portion of the rollable display device in a rolled-up state according to an exemplary embodiment of the present disclosure.

FIG. 12A is a view showing a portion of the rollable display device in an unrolled state according to an exemplary embodiment of the present disclosure, FIG. 12B is a view showing a portion of the rollable display device in a rolled-up state according to an exemplary embodiment of the present disclosure, FIG. 13A is a view showing a portion of the rollable display device in an unrolled state according to an exemplary embodiment of the present disclosure, FIG. 13B is a view showing a portion of the rollable display device in a rolled-up state according to an exemplary embodiment of the present disclosure, FIG. 14A is a view showing a portion of the rollable display device in an unrolled state according to an exemplary embodiment of the present disclosure, and FIG. 14B is a view showing a portion of the rollable display device in a rolled-up state according to an exemplary embodiment of the present disclosure. In FIGS. 12A, 12B, 13A, 13B, 14A, and 14A, the same reference numerals denote the same elements in FIGS. 1 to 10B, and thus detailed descriptions of the same elements will be omitted.

FIGS. 12A, 12B, 13A, 13B, 14A, and 14A show a roller having a hexagonal column shape as an example of polygonal column shapes defined by an even number (e.g., 2n, where n is a natural number equal to or greater than 2) of side surfaces SS. FIGS. 12A, 12B, 13A, 13B, 14A, and 14A show two consecutive support blocks. Among the support block groups SB1 to SBm, the second and third support block groups SB2 and SB3 will be described in detail as respective representative examples of the even-numbered and odd-numbered support block groups. The even-numbered support block groups have substantially the same structure as that of the second support block group SB2, and the odd-numbered support block groups have substantially the same structure as that of the third support block group SB3 (e.g., with the exception of width, etc.).

Referring to FIGS. 12A and 12B, some of the support blocks of each of the second and third support block groups SB2 and SB3 may be magnetic support blocks SB-MA. Among six support blocks of the second support block group SB2, the first to fifth support blocks are the magnetic support blocks SB-MA while the sixth support block is the non-magnetic support block SB-ME (e.g., a plastic or metallic support block). The five magnetic support blocks SB-MA of the second support block SB2 have the same magnetic arrangement. That is, only the last support block SB-ME is made of the non-magnetic substance, and the other support blocks SB-MA are made of the magnetic substance.

Among six support blocks of the third support block group SB3, the first to fifth support blocks are the magnetic support blocks SB-MA and the sixth support block is the metallic support block SB-ME. The five magnetic support blocks SB-MA of the third support block SB3 have the same magnetic arrangement. In this case, the five magnetic support blocks SB-MA of the third support block group SB3 have a magnetic arrangement that is opposite to that of the five corresponding support blocks SB-MA of the second support block group SB2 (e.g., the magnetic support blocks SB-MA of the third support block group SB3 have a magnetic pole alignment of south-north in the first direction DR1, while the five magnetic support blocks SB-MA of the second support block group SB2 have a magnetic pole alignment of north-south in the first direction DR1).

Referring to FIG. 12B, the magnetic poles of the magnetic support blocks SB-MA of the second support block group SB2 do not overlap identical magnetic poles of the magnetic support blocks SB-MA of the third support block group SB3 in the second/rolled-up mode. Accordingly, a distortion otherwise caused by a repulsive force between overlapping magnetic support blocks SB-MA that have aligned magnetic poles may be prevented. In addition, because the sixth support block SB-ME of the second support block group SB2 has the non-magnetic properties, a repulsive force that would otherwise be generated between the sixth support block of the second support block group SB2 and the first support block of the third support block group SB3 may be reduced.

The roller according to the present exemplary embodiment may have a polygonal column shape defined by an odd number of side surfaces. For instance, among the five support blocks of the third support block group SB3, the first to fourth support blocks may be the magnetic support blocks SB-MA while the fifth support block is the metallic support block SB-ME. The four magnetic support blocks SB-MA of the third support block group SB3 may have the same magnetic arrangement, while the four magnetic support blocks SB-MA of the second support block group 582 may have a magnetic arrangement opposite to that of the four magnetic support blocks SB-MA of the third support block group SB3.

Referring to FIGS. 13A and 13B, some of the support blocks of each of the second and third support block groups SB2 and SB3 may be the magnetic support block SB-MA. Among six support blocks of the second support block group SB2, odd-numbered support blocks (e.g., SB2-1) are the magnetic support blocks SB-MA, and even-numbered support blocks (e.g., SB2-6) are the non-magnetic support blocks SB-ME. Among six support blocks of the third support block group SB3, odd-numbered support blocks (e.g., SB3-1) are the magnetic support blocks SB-MA, and even-numbered support blocks (e.g., SB3-6) are the non-magnetic support blocks SB-ME. The order of the magnetic support blocks SB-MA and the non-magnetic support blocks SB-ME may be changed. The non-magnetic support blocks SB-ME may be plastic or metallic.

The odd-numbered support blocks of the second support block group SB2 have the same magnetic arrangement as each other in the first direction DR1. The odd-numbered support blocks of the third support block group SB3 have the same magnetic arrangement as each other in the first direction DR1, although the magnetic arrangement of the odd-numbered support blocks of the second support block group SB2 is opposite to the magnetic arrangement of the odd-numbered support blocks of the third support block group SB3.

Referring to FIG. 13B, the magnetic poles of the magnetic support blocks SB-MA of the second support block group SB2 do not overlap identical magnetic poles of the magnetic support blocks SB-MA of the third support block group SB3 in the second/rolled-up mode. Accordingly, a distortion otherwise caused by a repulsive force between overlapping magnetic support blocks SB-MA that have aligned magnetic poles may be prevented. In addition, because the sixth support block SB-ME of the second support block group SB2 has the non-magnetic properties, a repulsive force that would otherwise be generated between the sixth support block of the second support block group SB2 and the first support block of the third support block group SB3 may be reduced.

In the present exemplary embodiment, the odd-numbered support blocks of the second support block group SB2 have the same magnetic arrangement in the first direction DR1, which is opposite to the magnetic arrangement of the odd-numbered support blocks of the third support block group SB3 in the first direction DR1.

Referring to FIGS. 14A and 14B, some of the support blocks of each of the second and third support block groups SB2 and SB3 may be magnetic. Among six support blocks of the second support block group SB2, odd-numbered support blocks are the magnetic support blocks SB-MA and even-numbered support blocks are the non-magnetic support blocks SB-ME. Among six support blocks of the third support block group SB3, even-numbered support blocks are the magnetic support blocks SB-MA and odd-numbered support blocks are the non-magnetic support blocks SB-ME. The non-magnetic support blocks SB-ME may be plastic or metallic.

In the present exemplary embodiment, the order of the magnetic support blocks SB-MA and the non-magnetic support blocks SB-ME of the second and third support block groups SB2 and SB3 may be changed.

Referring to FIG. 14B, the odd-numbered support blocks of the second support block group SB2 overlap the odd-numbered support blocks of the third support block group SB3 in the second/rolled-up mode. Because either the odd-numbered support blocks of the second support block group SB2 or the odd-numbered support blocks of the third support block group SB3 have the magnetic properties, a distortion otherwise caused by a repulsive force generated between overlapping magnetic support blocks SB-MA may be prevented.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A rollable display device comprising:
a flexible display module configured to display an image, the flexible display module having a front surface and a rear surface facing the front surface;

a roller configured to roll up the flexible display module; and a plurality of support block groups each comprising a plurality of support blocks and arranged in a first direction crossing a second direction of a rolling axis of the roller, the plurality of support block groups comprising:

a first support block group comprising first support blocks; and a second support block group comprising second support blocks each having a width in the first direction that is greater than a width of a corresponding one of the first support blocks in the first direction, wherein the first support block group is between the roller and the second support block group when the flexible display module is unrolled from the roller, and wherein the first support block group and the second support block group are disposed on the same surface when the flexible display module is unrolled from the roller.

2. The rollable display device of claim 1, wherein the roller has a polygonal column shape comprising n side surfaces, n being a natural number equal to or greater than 3.

3. The rollable display device of claim 2, wherein the first support block group consists of (n−1) first support blocks, and wherein the second support block group consists of n second support blocks.

4. The rollable display device of claim 2, wherein the first support block group consists of n first support blocks, and wherein the second support block group consists of n second support blocks.

5. The rollable display device of claim 4, wherein each of the n first support blocks comprises a magnetic support block, and wherein each of the n second support blocks comprises a metallic support block.

6. The rollable display device of claim 4, wherein each of the first and second support blocks comprises a magnetic support block, wherein adjacent ones of the first support blocks have oppositely arranged magnetic poles with respect to the second direction, and wherein adjacent ones of the second support blocks have oppositely arranged magnetic poles with respect to the second direction.

7. The rollable display device of claim 4, wherein each of the first and second support blocks comprises a magnetic portion, and a non-magnetic portion adjacent the magnetic portion.

8. The rollable display device of claim 4, wherein each of the first and second support blocks comprise a first support portion, and a second support portion spaced from the first support portion in the second direction.

9. The rollable display device of claim 4, wherein each of the first and second support blocks comprises a non-magnetic support block with a magnetic substance coupled thereto.

10. The rollable display device of claim 1, wherein the roller has a polygonal column shape comprising 2n−1 side surfaces, n being a natural number equal to or greater than 2, wherein the first support block group comprises 2n−1 first support blocks comprising alternately arranged magnetic and non-magnetic support blocks, and wherein the second support block group comprises 2n−1 second support blocks comprising alternately arranged magnetic and non-magnetic support blocks.

11. The rollable display device of claim 10, wherein one of the alternately arranged magnetic and non-magnetic support blocks comprises a metallic support block.

12. The rollable display device of claim 1, wherein the roller has a polygonal column shape comprising 2n side surfaces, n being a natural number equal to or greater than 2, wherein the first support block group comprises 2n first support blocks comprising at least one magnetic support block, and wherein the second support block group comprises 2n second support blocks comprising at least one magnetic support block.

13. The rollable display device of claim 12, wherein first to (2n−1)th support blocks of the 2n first support blocks comprise magnetic support blocks, wherein a 2n-th support block of the 2n first support blocks comprises a metallic support block, wherein first to (2n−1)th support blocks of the 2n second support blocks comprise a magnetic support block, and wherein a 2n-th support block of the 2n second support blocks comprises a metallic support block.

14. The rollable display device of claim 13, wherein magnetic poles of the magnetic support blocks of the first support blocks are oppositely arranged in the first direction to magnetic poles of the magnetic support blocks of the second support blocks.

15. The rollable display device of claim 12, wherein the first support blocks comprise alternately arranged magnetic and metal support blocks, wherein the second support blocks comprise alternately arranged magnetic and metal support blocks, and wherein magnetic poles of the magnetic support blocks of the first support blocks are oppositely arranged in the first direction to magnetic poles of the magnetic support blocks of the second support blocks.

16. The rollable display device of claim 12, wherein the first support blocks comprise alternately arranged magnetic and metal support blocks, wherein the second support blocks comprise alternately arranged magnetic and metal support blocks, and wherein an order of the alternately arranged magnetic and metal support blocks of the first support blocks is opposite to an order of the alternately arranged magnetic and metal support blocks of the second support blocks.

17. The rollable display device of claim 1, further comprising a housing accommodating the roller, the housing defining a slit through which the flexible display module is configured to pass.

18. The rollable display device of claim 17, wherein the flexible display module comprises:

a display panel;

a touch panel on the display panel; and a window member on the touch panel.

19. A rollable display device comprising:

a flexible display module configured to display an image, the flexible display module having a front surface and a rear surface facing the front surface;

a roller configured to roll up the flexible display module;

a plurality of first support blocks, each of the first support blocks having a width in a first direction crossing a second direction of a rolling axis of the roller; and a plurality of second support blocks, each of the second support blocks having a width in the first direction, wherein the first support blocks are between the roller and the second support blocks when the flexible display module is unrolled from the roller, wherein the width of a widest of the first support blocks is less than the width of each of the second support blocks, and wherein the first support blocks and the second support blocks are disposed on the same surface when the flexible display module is unrolled from the roller.

20. The rollable display device of claim 19, wherein adjacent ones of the first and second support blocks contact each other when the flexible display module is unrolled from the roller.

* * * * *